(12) United States Patent
Besley et al.

(10) Patent No.: US 10,887,519 B2
(45) Date of Patent: Jan. 5, 2021

(54) METHOD, SYSTEM AND APPARATUS FOR STABILISING FRAMES OF A CAPTURED VIDEO SEQUENCE

(71) Applicant: CANON KABUSHIKI KAISHA, Tokyo (JP)

(72) Inventors: James Austin Besley, Killara (AU); Iain Bruce Templeton, Marsfield (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/838,363

(22) Filed: Apr. 2, 2020

(65) Prior Publication Data
US 2020/0236283 A1 Jul. 23, 2020

Related U.S. Application Data

(63) Continuation of application No. 16/162,109, filed on Oct. 16, 2018, now Pat. No. 10,645,290.

(30) Foreign Application Priority Data

Oct. 31, 2017 (AU) ................................ 2017254859

(51) Int. Cl.
*H04N 5/232* (2006.01)
*G06T 7/33* (2017.01)
(Continued)

(52) U.S. Cl.
CPC ......... *H04N 5/23267* (2013.01); *G06T 5/003* (2013.01); *G06T 5/50* (2013.01);
(Continued)

(58) Field of Classification Search
CPC .......... H04N 5/23267; H04N 5/23254; H04N 5/247; G06T 5/50; G06T 5/003;
(Continued)

(56) References Cited

U.S. PATENT DOCUMENTS

| | | | |
|---|---|---|---|
| 8,947,529 B2 * | 2/2015 | Strine ................ | H04N 5/23267 348/143 |
| 2015/0206289 A1 * | 7/2015 | Wang ........................ | G06T 5/50 348/208.6 |

(Continued)

*Primary Examiner* — Nhan T Tran
(74) *Attorney, Agent, or Firm* — Canon U.S.A., Inc. IP Division

(57) ABSTRACT

A method of stabilising frames of a captured video sequence. First reference patch alignment data is received for each of a plurality of reference patch locations. A first stable frame and a subsequent stable frame are determined from a first plurality of frames based on the first plurality of reference patch locations and reference patch alignment data. A second plurality of reference patch locations is determined using image data from the first stable frame, the second plurality of reference patch locations being determined concurrently with determining the subsequent stable frame from the first plurality of frames. Image data for the determined second plurality of reference patch locations is extracted from the subsequent stable frame. A second plurality of stable frames of the captured video sequence is determined with respect to the reference frame using the second plurality of reference patch locations and the extracted image data.

14 Claims, 16 Drawing Sheets

(51) Int. Cl.
*G06T 5/00* (2006.01)
*G06T 5/50* (2006.01)

(52) U.S. Cl.
CPC ......... *G06T 7/337* (2017.01); *H04N 5/23254* (2013.01); *G06T 2207/10016* (2013.01); *G06T 2207/10024* (2013.01); *G06T 2207/20201* (2013.01)

(58) Field of Classification Search
CPC ........... G06T 7/337; G06T 2207/10024; G06T 2207/20201; G06T 2207/10016
See application file for complete search history.

(56) References Cited

U.S. PATENT DOCUMENTS

2017/0332018 A1\* 11/2017 Bell .................... H04N 5/23267
2018/0174326 A1\* 6/2018 Katchalov ............... G06T 7/337

\* cited by examiner

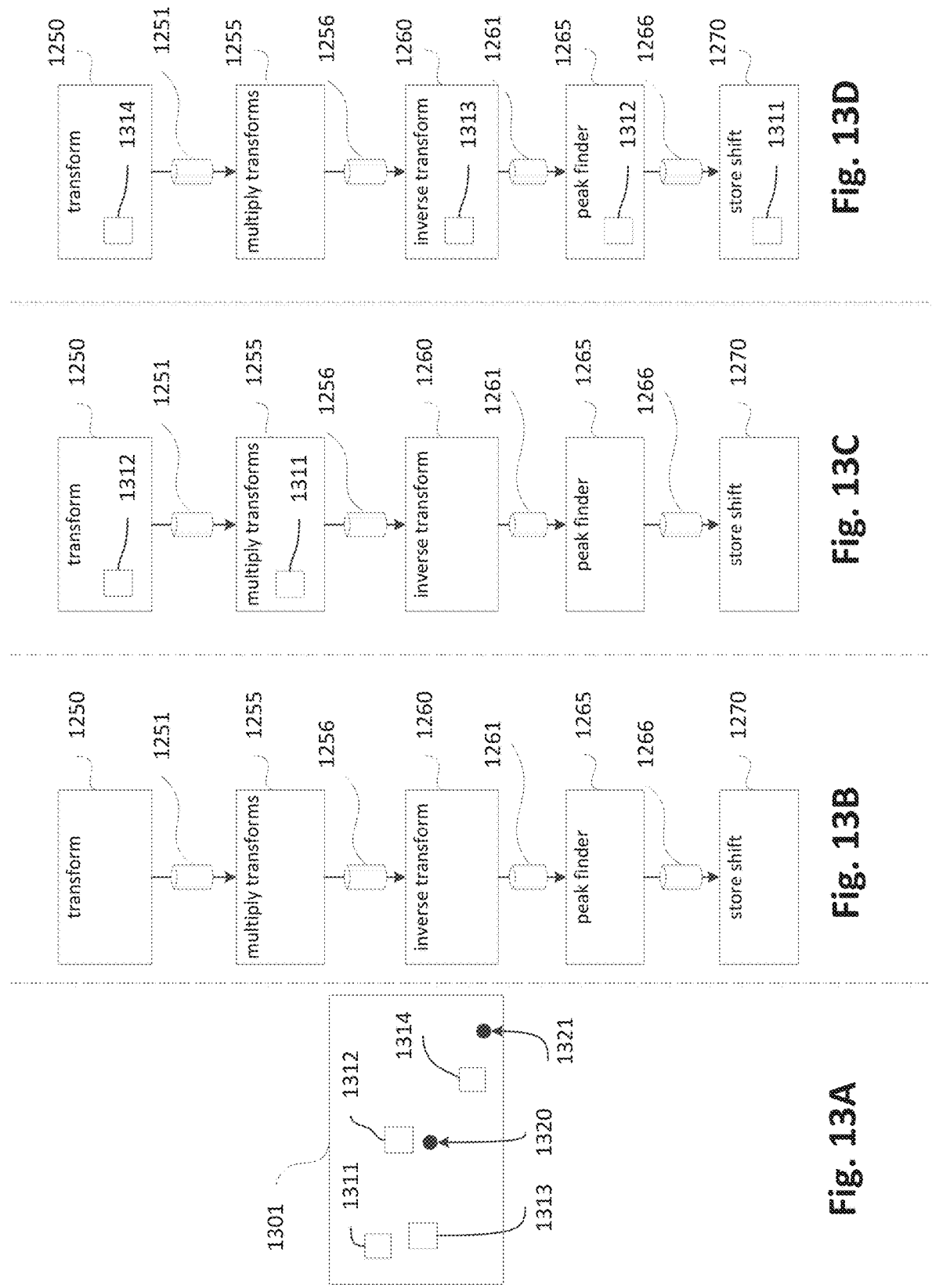

METHOD, SYSTEM AND APPARATUS FOR STABILISING FRAMES OF A CAPTURED VIDEO SEQUENCE

REFERENCE TO RELATED PATENT APPLICATION

This application is a continuation of U.S. patent application Ser. No. 16/162,109, filed on Oct. 16, 2018, which claims the benefit under 35 U.S.C. § 119 of the filing date of Australian Patent Application No. 2017254859, filed Oct. 31, 2017, hereby incorporated by reference in its entirety as if fully set forth herein.

FIELD OF ART

The present disclosure relates to the analysis of video sequences to detect changes in calibration parameters of an imaging device such as a camera. In particular, the present disclosure also relates to a method, system and apparatus for stabilising frames of a captured video sequence. The present disclosure also relates to a computer program product including a computer readable medium having recorded thereon a computer program for stabilising frames of a captured video sequence.

DESCRIPTION OF BACKGROUND ART

Camera stabilisation is an important technology used to improve the quality of still images and video images captured by a device. The stabilisation may be used for a stand-alone camera, or for cameras within a network configured for a wide range of applications including surveillance, event broadcast, cinematography, medical imaging or other analysis. For example, a camera network may be used in a computer vision system used to generate free viewpoint video (FVV) of objects and activity in a field of view surrounded and imaged by a network of cameras. Such a FVV system may be capable of processing video images in real time and generating virtual video footage of the scene suitable for broadcast with a low latency. Virtual video images may be generated from a variety of viewpoints and orientations that do not correspond to any of the cameras in the network.

Many camera stabilisation methods have been developed, and the appropriate method depends on the environment and requirements of a given camera system. Mechanical stabilisation systems include specialised mounts, shoulder braces and gimbals. The mechanical stabilisation systems are popular for producing a wide range of content such as cinema and live broadcast of events. The mechanical stabilisation systems are generally suitable for moving cameras, such as mounted cameras that pan and zoom to track the events on a sports field, or roving cameras that can be deployed rapidly for on the spot coverage. Mechanical stabilisation systems damp out high frequency instability. However, mechanical systems would not be expected to handle lower frequency motion such as drift.

Other image stabilisation methods that are included within a camera have also been developed. For example, optical image stabilisation is common on modern cameras and operates by varying the optical path to a sensor. Such methods are particularly effective at removing camera shake from captured images and, in particular, the kind of camera shake associated with a hand held camera. In addition to stabilisation of video sequences, optical image stabilisation and the like can improve the sharpness of individual frames by removing blur. Optical image stabilisation can also improve the performance of auto-focus which may be reduced by instability in an image capture sequence. However optical image stabilisation generally does not handle camera roll and may not be suitable for low frequency instability such as drift in a mounted, fixed camera.

Another internal camera stabilisation method varies the position of a sensor rather than the optical path. Methods which vary the position of a sensor have the advantage over optical stabilisation of being capable of correcting for camera roll. Gyroscope data or a DSP may be used to calculate the required sensor shift based on captured images. The maximum correction available depends on the maximum motion of the sensor which may limit the extent of stabilisation to large displacements such as low frequency drift in a fixed mounted camera system.

In addition to mechanical and optical stabilisation methods, a number of digital image stabilisation methods exist that rely purely on digital processing of captured images. Digital image stabilisation methods transform the image at each frame to compensate for motion of the camera. Some digital image stabilisation methods have limitations with processing the very high data rate from a modern camera which may consist of high definition images at a high frame rate. The limitations may be avoided by post-processing of video sequences. However, post-processing of video sequences may not be possible in all scenarios, such as in the case of live broadcast events where latency is critical. Other digital image stabilisation methods have performance that degrades over time due to variations in the image content.

The stabilisation methods described above are unable to handle high and low frequency instabilities in image capture at high frame rates and high resolution using limited hardware over long periods of time. Hence, there is a need for a long term low latency digital image stabilisation method that can handle a broad range of camera instabilities using relatively low storage and computation cost.

SUMMARY

It is an object of the present invention to substantially overcome, or at least ameliorate, one or more disadvantages of existing arrangements.

According to one aspect of the present disclosure, there is provided a method of stabilising frames of a captured video sequence, the method comprising:

receiving a first plurality of reference patch locations in a reference frame;

receiving first reference patch alignment data for each of the plurality of reference patch locations;

determining a first stable frame and a subsequent stable frame from a first plurality of frames based on the first plurality of reference patch locations and reference patch alignment data;

determining a second plurality of reference patch locations using image data from the first stable frame, the second plurality of reference patch locations being determined concurrently with determining the subsequent stable frame from the first plurality of frames, wherein image data for the determined second plurality of reference patch locations is extracted from the subsequent stable frame; and determining a second plurality of stable frames of the captured video sequence with respect to the reference frame using the second plurality of reference patch locations and the extracted image data.

According to another aspect of the present disclosure, there is provided an apparatus for stabilising frames of a captured video sequence, the apparatus comprising:

means for receiving a first plurality of reference patch locations in a reference frame;

means for receiving first reference patch alignment data for each of the plurality of reference patch locations;

means for determining a first stable frame and a subsequent stable frame from a first plurality of frames based on the first plurality of reference patch locations and reference patch alignment data;

means for determining a second plurality of reference patch locations using image data from the first stable frame, the second plurality of reference patch locations being determined concurrently with determining the subsequent stable frame from the first plurality of frames, wherein image data for the determined second plurality of reference patch locations is extracted from the subsequent stable frame; and means for determining a second plurality of stable frames of the captured video sequence with respect to the reference frame using the second plurality of reference patch locations and the extracted image data.

According to still another aspect of the present disclosure, there is provided a system for stabilising frames of a captured video sequence, the system comprising:

a memory for storing data and a computer program;

a processor coupled to the memory for executing the computer program, said computer program having instructions for:

receiving a first plurality of reference patch locations in a reference frame;

receiving first reference patch alignment data for each of the plurality of reference patch locations;

determining a first stable frame and a subsequent stable frame from a first plurality of frames based on the first plurality of reference patch locations and reference patch alignment data;

determining a second plurality of reference patch locations using image data from the first stable frame, the second plurality of reference patch locations being determined concurrently with determining the subsequent stable frame from the first plurality of frames, wherein image data for the determined second plurality of reference patch locations is extracted from the subsequent stable frame; and determining a second plurality of stable frames of the captured video sequence with respect to the reference frame using the second plurality of reference patch locations and the extracted image data.

According to still another aspect of the present disclosure, there is provided a computer readable medium having a program stored on the medium for stabilising frames of a captured video sequence, the program comprising:

code for receiving a first plurality of reference patch locations in a reference frame;

code for receiving first reference patch alignment data for each of the plurality of reference patch locations;

code for determining a first stable frame and a subsequent stable frame from a first plurality of frames based on the first plurality of reference patch locations and reference patch alignment data;

code for determining a second plurality of reference patch locations using image data from the first stable frame, the second plurality of reference patch locations being determined concurrently with determining the subsequent stable frame from the first plurality of frames, wherein image data for the determined second plurality of reference patch locations is extracted from the subsequent stable frame; and code for determining a second plurality of stable frames of the captured video sequence with respect to the reference frame using the second plurality of reference patch locations and the extracted image data.

Other aspects are also disclosed.

BRIEF DESCRIPTION OF THE DRAWINGS

One or more embodiments will now be described with reference to the following drawings, in which:

FIG. 13A shows an example video frame defined by a video frame bounding box;

FIG. 13B shows patch analysis processing steps;

FIG. 13C shows the status of pipeline stages while processing the frame of FIG. 13A at a point;

FIG. 13D shows the status of pipeline stages while processing the frame of FIG. 13A at another point.

DETAILED DESCRIPTION OF EMBODIMENTS

Figure 1:
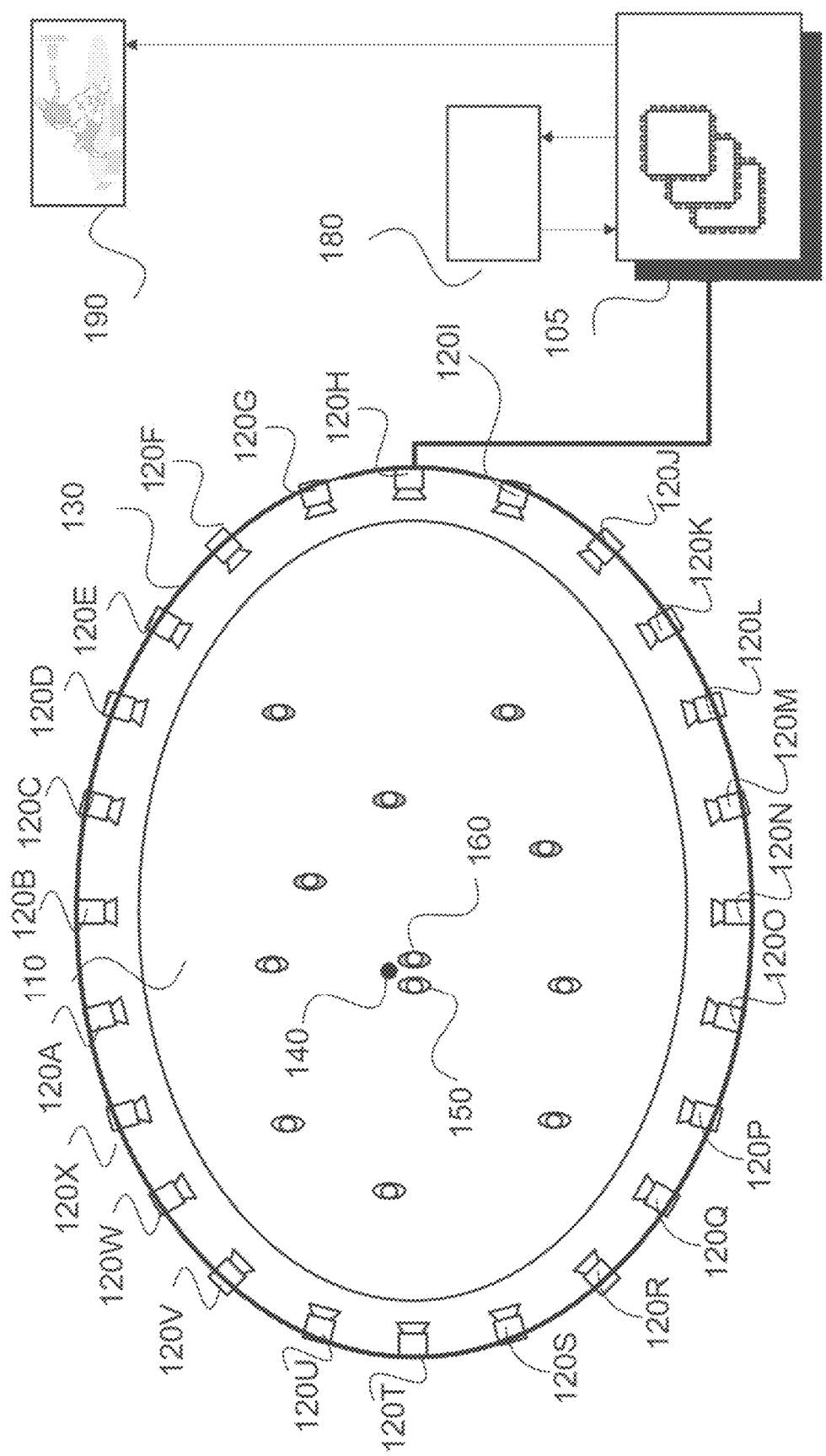
FIG. 1 shows a network of cameras surrounding a region of interest (ROI)

Where reference is made in any one or more of the accompanying drawings to steps and/or features, which have the same reference numerals, those steps and/or features have for the purposes of this description the same function(s) or operation(s), unless the contrary intention appears.

Free viewpoint video (FVV) systems may require accurate calibration data corresponding to captured video frames in order to generate high quality virtual video. FVV systems may also require stabilised video sequences to enable accurate, high speed image processing operations, such as segmentation of image content to foreground and background regions. For segmentation of image content to foreground and background regions, stabilisation is required as an early pre-processing step in analysis of video frames and must be performed with minimal latency to enable later steps in a processing pipeline.

A computer-implemented method, system, and computer program product for detecting changes in calibration parameters of an imaging device such as a camera, are described below. The described methods may be used to analyse video sequences to detect changes in calibration parameters. The calibration parameters consist of extrinsic parameters (e.g., orientation and pose) and intrinsic parameters (e.g., focal lengths, principal point offset and axis skew). Detected changes in a calibration parameter may be used to transform the captured image such that the captured image accurately matches the image that would have been captured without instability of the camera parameters. Transforming a captured image where only extrinsic parameters vary, may be referred to as stabilisation. Alternatively, detected changes may be used to update camera calibration parameters, such as for use in a computer vision system that analyses three-dimensional (3D) structure of an image space using a calibrated camera or camera network.

Arrangements described herein may be used with a network of cameras 120A-120X, as seen in FIG. 1, set up around a region of interest (ROI) 110 for live capture and broadcast. The network of cameras 120A-120X is configured as a ring of cameras 120 in the example of FIG. 1.

As described below, the cameras 120A-120X may be part of a large computer vision system used to generate free viewpoint video (FVV). The FVV system may be used to process video in real time and generate virtual video footage of a scene suitable for broadcast with a low latency.

The cameras 120A-120X of FIG. 1A surround the ROI 110 in a single ring of cameras. However, in another arrangement, cameras may surround a ROI in a plurality of rings at different heights.

As seen in FIG. 1, the cameras 120A-120X are evenly spread around the ROI. In another arrangement, there may be a larger density of cameras at particular locations, or the locations of the cameras may be randomly spread. The locations of the cameras may be limited, for example, due to the physical surroundings of the ROI.

In the arrangement of FIG. 1, the cameras 120A-120X are mounted and fixed. However, in alternative arrangements, the cameras 120A-120X may be capable of pan, tilt and zoom (PTZ) and may be hand held and mobile. In order to produce FVV, stabilised frames may be required from captured video. Alternatively, accurate calibration data associated with each frame may be required. The calibration data may include the effect of any temporal variation in image capture due to the cameras 120A-120X either being controlled (e.g. by an operator or some kind of automated control system) or due to mechanical or optical instability in the cameras 120A-120X. The instability may include vibrations, hand shake, or slow drifts such as are due to environmental changes (e.g., temperature, air pressure, wind, crowd motion, etc).

In one arrangement, the ROI 110 may be a sports venue, arena or stadium with a large number of cameras (e.g., tens or hundreds of cameras) with fixed pan, tilt, zoom (PTZ) directed in towards a playing area. Such a playing area is approximately rectangular, circular or oval, allowing the playing area to be surrounded by one or more rings of cameras so that all points on the playing area are captured simultaneously from a large number of viewpoints. In some arrangements, a full ring of cameras is not employed but rather some subsets of the cameras 120A-120X are used. Arrangements where subsets of the cameras 120A-120X are used may be advantageous when certain viewpoints are known to be unnecessary ahead of time.

In one arrangement, the cameras 120A-120X may be synchronised to acquire frames at the same instants in time.

In one arrangement, the cameras 120A-120X may be roughly set up at different heights (e.g. in three (3) rings at different heights) and may focus on specific pre-selected areas of a playing field within the ROI 110. The image features used for stabilisation may be line like field markings.

Methods described below are configured to be robust to dynamic occlusions such as players moving on the field and crowd movements in the stands. The described methods are also configured to handle periodic structures like parallel line markings.

Alternatively, the ROI may be a stage at a performance venue. For such a stage, a set of cameras (e.g., tens of cameras) may be directed in towards the stage from various directions in front of the performance. In such a stage arrangement, challenges may include changing scenery or equipment on the stage. The features for image processing used in such a stage arrangement may be more varied than for a sports venue.

The cameras 120A-120X may be traditional live broadcast types of cameras, digital video cameras, surveillance cameras, or other devices with imaging capability such as a mobile phone, tablet, computer with web-cam, etc. In the described arrangements, the cameras 120A-120X capture high definition (HD) video frames. However, all of the described methods may be adapted to other frame formats such as SD, 4K or 8K.

In the example of FIG. 1, the ROI 110 is an arena 110 having an oval playing field surrounded by the ring of cameras 120. The arena 110, in the example of FIG. 1, contains players from a first team (e.g. 150) and a second team (e.g. 160) and a ball 140. In the example of FIG. 1, the player 150 may be represented by a first object, the player 160 may be represented by a second object and the ball 140 by a third object.

Figure 2A:
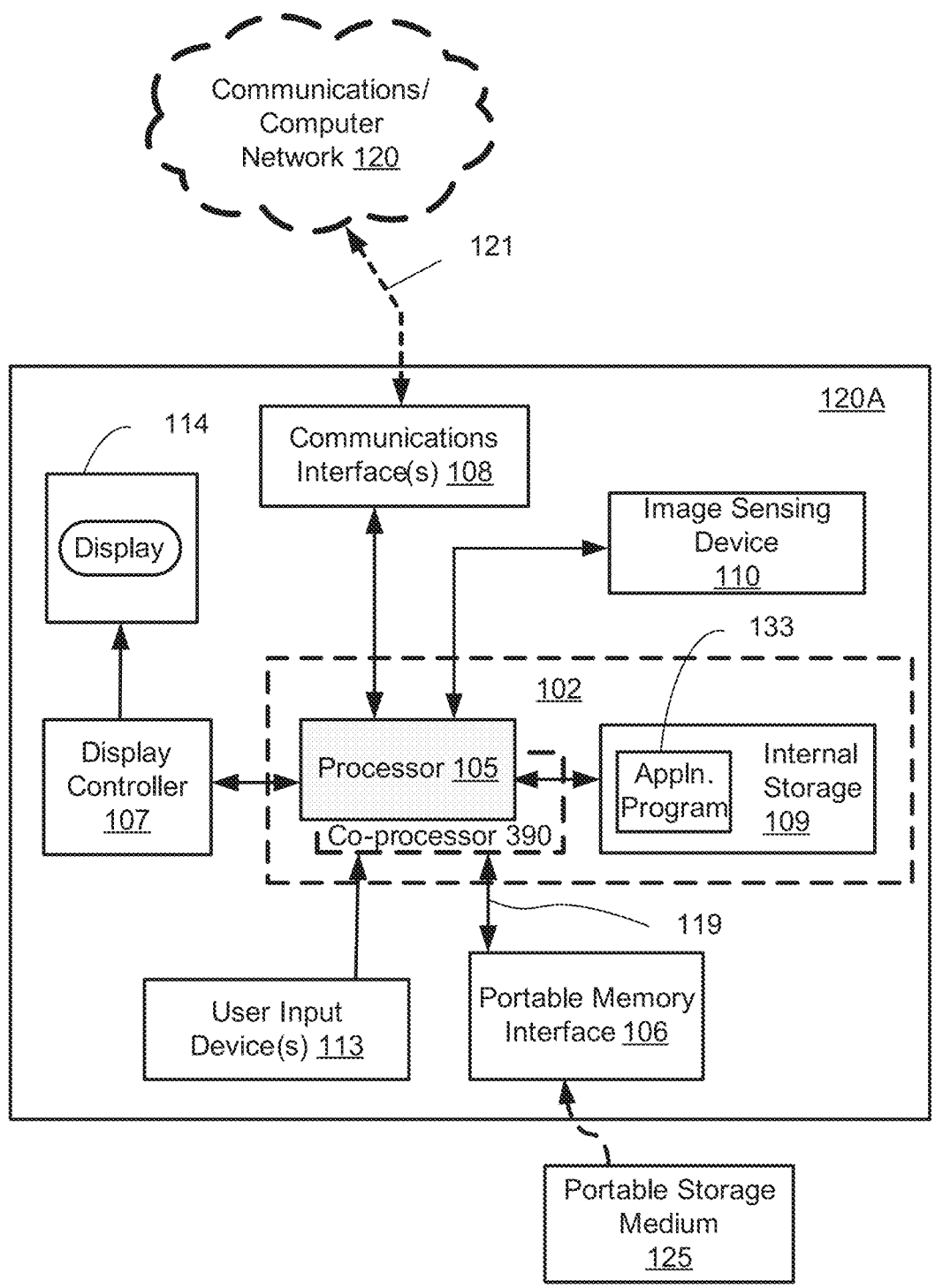
FIGS. 2A and 2B collectively form a schematic block diagram representation of a camera system upon which described arrangements can be practiced.

Video frames captured by a camera, such as the camera 120A, are subject to processing and temporary storage near the camera 120A prior to being made available, via a network connection 130, to a processing unit 105 (see FIGS. 2A and 2B) configured for performing video processing. As seen in FIG. 2A, the processing unit 805 is configured within a computer module 801. However, in an alternative arrangement, a separate video processing unit may be used to implement the described arrangements.

The processing unit 105 receives controlling input from a controller 180 that specifies the position of a virtual camera within the arena 110. The processing unit 105 may be configured to synthesise a specified camera point of view (or viewpoint) 190 based on video streams available to the processing unit 105 from the cameras 120A-120X surrounding the arena 110.

The virtual camera position input may be generated by a human virtual camera operator and be based on input from a user interface device such as a joystick, mouse 103 (see FIG. 2A) or similar controller including dedicated controllers comprising multiple input components. Alternatively, the camera position may be generated fully automatically based on analysis of game play. Hybrid control configurations are also possible whereby some aspects of the camera positioning are directed by a human operator and others by an automated algorithm. For example, coarse positioning may be performed by a human operator and fine positioning, including stabilisation and path smoothing may be performed by an automated algorithm.

The processing unit 105 may be configured to achieve frame synthesis using any suitable image based rendering method. Image based rendering methods may be based on sampling pixel data from a set of cameras of known geometric arrangement and combining the sampled pixel data, into a synthesised frame. In addition to sample based rendering a requested frame, the processing unit 105 may be additionally configured to perform synthesis, 3D modelling, in-painting or interpolation of regions as required to cover sampling deficiencies and to create frames of high quality visual appearance. The processing unit 105 may also be configured to provide feedback in the form of the frame quality or the completeness of camera coverage for the requested viewpoint so that a device generating the camera position control signal can be aware of the practical bounds of the processing unit 105. Video streams 190 created by the processing unit 105 may subsequently be provided to a production desk (not depicted) where the video streams 190 may be edited together to form a broadcast video. Alternatively, the video streams may be broadcast unedited or stored for later compilation.

In one arrangement, image stabilisation is performed on a dedicated processing unit connected directly to a camera, such as the camera 120A. However, in other arrangements, analysis may be performed on a server or other non-local processing unit such as the video processing unit 105 described above. The advantage of analysis at or near to the camera 120A is the potential for reduced latency.

Before further describing the methods, some concepts and parameters related to calibration parameters and warp maps that will be used within the description, will now be defined. Alternative derivations and more complex camera models may be used interchangeably with the camera models described herein.

A pinhole model is a simple and commonly used model of a camera, such as the camera 120A. The pinhole model defines the relationship between sensor pixel coordinates (u, v) and corresponding points (X, Y, Z) in a 3D physical space. According to the pinhole model, a point (X, Y, Z) and corresponding sensor image pixel coordinates (u, v) are related by a linear equation defined by Equation (1), below:

$$s \begin{bmatrix} u \\ v \\ 1 \end{bmatrix} = A \cdot R \cdot \begin{bmatrix} X \\ Y \\ Z \end{bmatrix} + T \quad (1)$$

where s is a scalar normalization term, A is a 3×3 intrinsic matrix for the camera 120A, R is a 3×3 rotation matrix and T is a 3×1 translation vector. The intrinsic matrix is a 3×3 matrix defined by Equation (2), as follows:

$$A = \begin{bmatrix} f_x & 0 & \pi_x \\ 0 & f_y & \pi_y \\ 0 & 0 & 1 \end{bmatrix} \quad (2)$$

The intrinsic matrix of the camera 120A describes the principal point ($\pi_x$, $\pi_y$) and the scaling ($f_x$, $f_y$) of image pixels. The principal point is the point where the lens optical axis meets the image plane, expressed in pixels. The scaling of image pixels is dependent on the focal length of the lens and the size of image pixels.

The rotation matrix, R, and translation vector, T, define what are known as the extrinsic parameters of the camera 120A. R is a 3×3 rotation matrix representing the orientation of the camera 120A relative to a 3D physical space world coordinate system. T is a 3×1 translation vector relative to a 3D physical space world coordinate system.

A warp map or image distortion map is a mapping function that may be applied to a first image, referred to as the moving image m, to generate a distorted image. The warp map may be defined such that the image content of the distorted image is aligned with that of a second image, referred to as the fixed image, according to some criterion. In the following description, the fixed image corresponds to a reference frame and the moving image to a target frame from a video sequence.

The image warp map may be represented as a relative displacement from an identity transformation at each location in an image. A complex number may be used to represent the displacement at each pixel, where the real value corresponds to the displacement along the x-axis, and the imaginary part corresponds to displacement along the y-axis. The warp map may be represented as a matrix of complex displacement values over the matrix of locations in the image, and a warp map representing an identity transformation would contain only zero vectors.

To apply a warp map, the warp map matrix is added to a matrix of image pixel locations represented as complex numbers (with a real component representing the x-coordinate and imaginary component representing the y-coordinate of the pixel location) to provide a mapping matrix. The mapping matrix represents corresponding coordinates of each pixel in the fixed image within the moving image. Each pixel in the distorted image may be generated based on the moving image pixel data at a position defined by a mapping matrix at the corresponding pixel location. In general, the mapping does not map distorted image pixels from exact pixel locations in the moving image. Therefore, some form of interpolation may be used to generate an accurate distorted image. Various suitable interpolation methods may be used, including nearest neighbour, linear, and various non-linear interpolation methods (cubic, sinc, Fourier, etc). Unless otherwise specified, cubic interpolation will be assumed throughout this disclosure as cubic interpolation provides a good trade-off between accuracy and computational complexity.

Depending on the properties of the warp map there may be efficient methods of storing and applying the warp map to an image. According to one implementation, the distortion map may be represented in a down-sampled form in which the mapping is not read directly from the image distortion map, but is interpolated from values in a low-resolution image distortion map. For large images, representing the distortion map in a down-sampled form can save memory and processing time. Alternatively, if the warp takes the form of a simple function such as a projective, affine, or RST transform, then the warp may be more efficient to generate mappings as needed based on the functional form.

Alternative warp map representations and methods of application to the examples described here may be suitable for use in the described methods. Additionally, warp maps may be combined together, which may require interpolation of the warp map content, or in the case of simple functional warps may only require a functional combination of the individual warp maps. Any suitable method for performing such combination of warp maps may be used to implement the methods described below.

Detected changes in camera calibration parameters may be used in processing of a video sequence comprising a plurality of images, for example, to transform the video sequence frames to match a reference frame or to update camera calibration parameters used in a computer vision system.

The camera calibration parameter change detection methods to be described below herein will be described by way of example with reference to the camera 120A. However, the described methods may be implemented using any of the cameras 120A-120X.

Figure 2B:
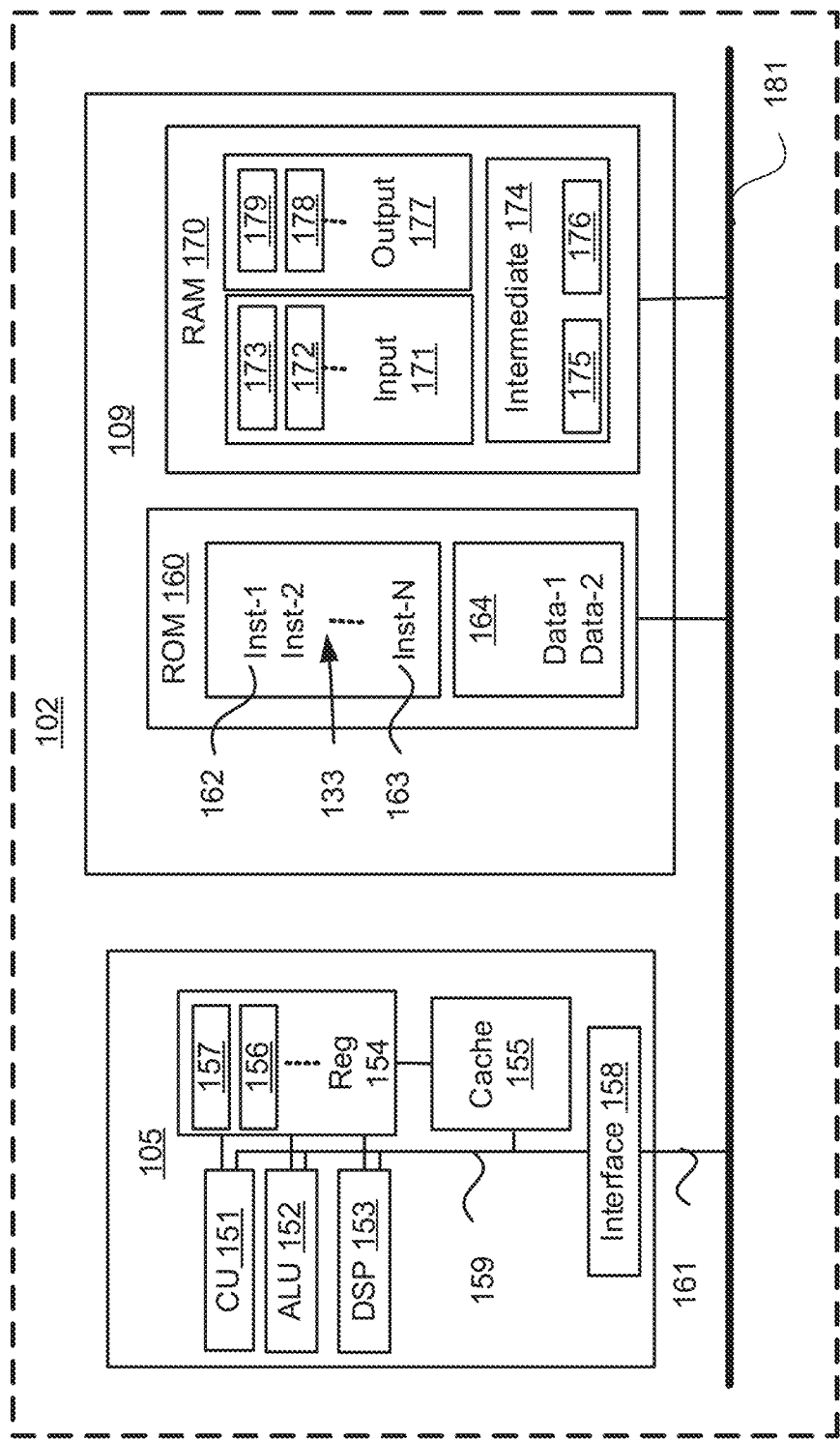

FIGS. 2A and 2B collectively form a schematic block diagram of the camera 120A including embedded components, upon which the camera calibration parameter change detection methods to be described are desirably practiced.

The camera 120A may be, for example, a digital camera or a mobile phone, in which processing resources are limited. Nevertheless, the methods to be described may also be performed on higher-level devices such as desktop computers, server computers, and other such devices with significantly larger processing resources.

The camera 120A is used to capture input images representing visual content of a scene appearing in the field of view (FOV) of the camera 120A. Each image captured by the camera 120A comprises a plurality of visual elements. A visual element is defined as an image sample. In one arrangement, the visual element is a pixel, such as a Red-Green-Blue (RGB) pixel. In another arrangement, each visual element comprises a group of pixels. In yet another arrangement, the visual element is an 8 by 8 block of transform coefficients, such as Discrete Cosine Transform (DCT) coefficients as acquired by decoding a motion-JPEG frame, or Discrete Wavelet Transformation (DWT) coefficients as used in the JPEG-2000 standard. The colour model is YUV, where the Y component represents luminance, and the U and V components represent chrominance.

As seen in FIG. 2A, the camera 120A comprises an embedded controller 102. In the present example, the controller 102 comprises the processing unit (or processor) 105 which is bi-directionally coupled to an internal storage module 109. As seen in FIG. 2A, in one arrangement, the camera 120A may also comprise a co-processor 390 (represented by a dashed outline is FIG. 2A). Again, in such an arrangement, the co-processor 390 would be bi-directionally coupled to the internal storage module 109. The storage module 109 may be formed from non-volatile semiconductor read only memory (ROM) 160 and semiconductor random access memory (RAM) 170, as seen in FIG. 2B. The RAM 170 may be volatile, non-volatile or a combination of volatile and non-volatile memory.

The camera 120A includes a display controller 107, which is connected to a display 114, such as a liquid crystal display (LCD) panel or the like. The display controller 107 is configured for displaying graphical images on the display 114 in accordance with instructions received from the controller 102, to which the display controller 107 is connected.

The camera 120A also includes user input devices 113 which are typically formed by a keypad or like controls. In some implementations, the user input devices 113 may include a touch sensitive panel physically associated with the display 114 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 2A, the camera 120A also comprises a portable memory interface 106, which is coupled to the processor 105 via a connection 119. The portable memory interface 106 allows a complementary portable memory device 125 to be coupled to the camera 120A to act as a source or destination of data or to supplement the internal storage module 109. Examples of such interfaces permit coupling with portable memory devices such as Universal Serial Bus (USB) memory devices, Secure Digital (SD) cards, Personal Computer Memory Card International Association (PCMCIA) cards, optical disks and magnetic disks.

The camera 120A also has a communications interface 108 to permit coupling of the camera 120A to a computer or communications network 120 via a connection 121. The connection 121 may be wired or wireless. For example, the connection 121 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the controller 102, in conjunction with an image sensing device 110, is provided to perform the functions of the camera 120A. The image sensing device 110 may include a lens, a focus control unit and an image sensor. In one arrangement, the sensor is a photo-sensitive sensor array. As another example, the camera 120A may be a mobile telephone handset. In this instance, the image sensing device 110 may also represent those components required for communications in a cellular telephone environment. The image sensing device 110 may also represent a number of encoders and decoders of a type including Joint Photographic Experts Group (JPEG), (Moving Picture Experts Group) MPEG, MPEG-1 Audio Layer 3 (MP3), and the like. The image sensing device 110 captures an input image and provides the captured image as an input image.

The described methods below may be implemented using the embedded controller 102, where the processes of FIGS. 3 to 10 may be implemented as one or more software application programs 133 executable within the embedded controller 102. The camera 120A of FIG. 2A implements the described methods. In particular, with reference to FIG. 2B, the steps of the described methods are effected by instructions in the software 133 that are carried out within the controller 102. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 of the embedded controller 102 is typically stored in non-volatile RAM 170 of the internal storage module 109. The software 133 stored in the non-volatile RAM 170 can be updated when required from a computer readable medium. The software 133 can be loaded into and executed by the processor 105. In some instances, the processor 105 may execute software instructions that are located in RAM 170. Software instructions may be loaded into the RAM 170 by the processor 105 initiating a copy of one or more code modules from ROM 160 into RAM 170. Alternatively, the software instructions of one or more code modules may be pre-installed in a non-volatile region of RAM 170 by a manufacturer. After one or more code modules have been located in RAM 170, the processor 105 may execute software instructions of the one or more code modules.

The application program 133 is typically pre-installed and stored in the ROM 160 by a manufacturer, prior to distribution of the camera 120A. However, in some instances, the application programs 133 may be supplied to the user encoded on one or more CD-ROM (not shown) and read via the portable memory interface 106 of FIG. 2A prior to storage in the internal storage module 109 or in the portable memory 125. In another alternative, the software application program 133 may be read by the processor 105 from the network 120, or loaded into the controller 102 or the portable storage medium 125 from other computer readable media. Computer readable storage media refers to any non-transitory tangible storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the camera 120A. Examples of transitory or non-tangible computer readable transmission media that may also participate in the provision of software, application programs, instructions and/or data to the camera 120A include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 133 and the corresponding code modules mentioned above may be executed to implement one or more graphical user interfaces (GUIs) to be rendered or otherwise represented upon the display 114 of FIG. 2A. Through manipulation of the user input device 113 (e.g., the keypad), a user of the camera 120A and the application programs 133 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 2B illustrates in detail the embedded controller 102 having the processor 105 for executing the application programs 133 and the internal storage 109. The internal storage 109 comprises read only memory (ROM) 160 and random access memory (RAM) 170. The processor 105 is able to execute the application programs 133 stored in one or both of the connected memories 160 and 170. When the camera 120A is initially powered up, a system program resident in the ROM 160 is executed. The application program 133 permanently stored in the ROM 160 is sometimes referred to as "firmware". Execution of the firmware by the processor 105 may fulfil various functions, including processor management, memory management, device management, storage management and user interface.

The processor 105 typically includes a number of functional modules including a control unit (CU) 151, an arithmetic logic unit (ALU) 152 and a local or internal memory comprising a set of registers 154 which typically contain atomic data elements 156, 157, along with internal buffer or cache memory 155. One or more internal buses 159 interconnect these functional modules. The processor 105 typically also has one or more interfaces 158 for communicating with external devices via system bus 181, using a connection 161.

The application program 133 includes a sequence of instructions 162 through 163 that may include conditional branch and loop instructions. The program 133 may also include data, which is used in execution of the program 133. This data may be stored as part of the instruction or in a separate location 164 within the ROM 160 or RAM 170.

In general, the processor 105 is given a set of instructions, which are executed therein. This set of instructions may be organised into blocks, which perform specific tasks or handle specific events that occur in the camera 120A. Typically, the application program 133 waits for events and subsequently executes the block of code associated with that event. Events may be triggered in response to input from a user, via the user input devices 113 of FIG. 2A, as detected by the processor 105. Events may also be triggered in response to other sensors and interfaces in the camera 120A.

The execution of a set of the instructions may require numeric variables to be read and modified. Such numeric variables are stored in the RAM 170. The disclosed method uses input variables 171 that are stored in known locations 172, 173 in the memory 170. The input variables 171 are processed to produce output variables 177 that are stored in known locations 178, 179 in the memory 170. Intermediate variables 174 may be stored in additional memory locations in locations 175, 176 of the memory 170. Alternatively, some intermediate variables may only exist in the registers 154 of the processor 105.

The execution of a sequence of instructions is achieved in the processor 105 by repeated application of a fetch-execute cycle. The control unit 151 of the processor 105 maintains a register called the program counter, which contains the address in ROM 160 or RAM 170 of the next instruction to be executed. At the start of the fetch execute cycle, the contents of the memory address indexed by the program counter is loaded into the control unit 151. The instruction thus loaded controls the subsequent operation of the processor 105, causing for example, data to be loaded from ROM memory 160 into processor registers 154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 133, and is performed by repeated execution of a fetch-execute cycle in the processor 105 or similar programmatic operation of other independent processor blocks in the camera 120A.

A method 300 of detecting changes in camera calibration parameters of an input image captured by the camera 120A is now described with reference to FIG. 3. The method 300 may output transformed video sequence frames that match a reference frame or updated camera calibration parameters for use in a computer vision system. The method 300 may be implemented as one or more software code modules of the software application program 133 resident in the storage module 109 and being controlled in its execution by the processor 105 of the camera 120A. In one arrangement, software code modules of the program 133 implementing one of more of the steps of the method 300 may be controlled in their execution by the co-processor 390 (see FIG. 3) configured within the camera 120A.

The method 300 is a patch based alignment method that projects patch data along a preferred orientation such that each analysed patch provides a single shift estimate. The set of single shift estimates are combined together to determine a global transform suitable for stabilising a given frame of a captured video sequence. The method 300 may be used for stabilising the captured video sequence by stabilising frames of the captured video. As described in detail below, the method 300 may be used for determining stable frames of the captured video sequence with respect to a reference frame. However, the method 300 may also be used for other similar systems. For example, the method 300 may be used for patch based alignment methods that use two dimensional (2D) image patches and determine a 2D shift estimate with both direction and magnitude. The set of vector shift estimates may be combined together in a similar manner to a set of single shift estimates to estimate a global transform suitable for frame stabilisation. In one arrangement, the method 300 may output parameters suitable for updating camera calibration parameters for use in a computer vision system.

Figure 3:
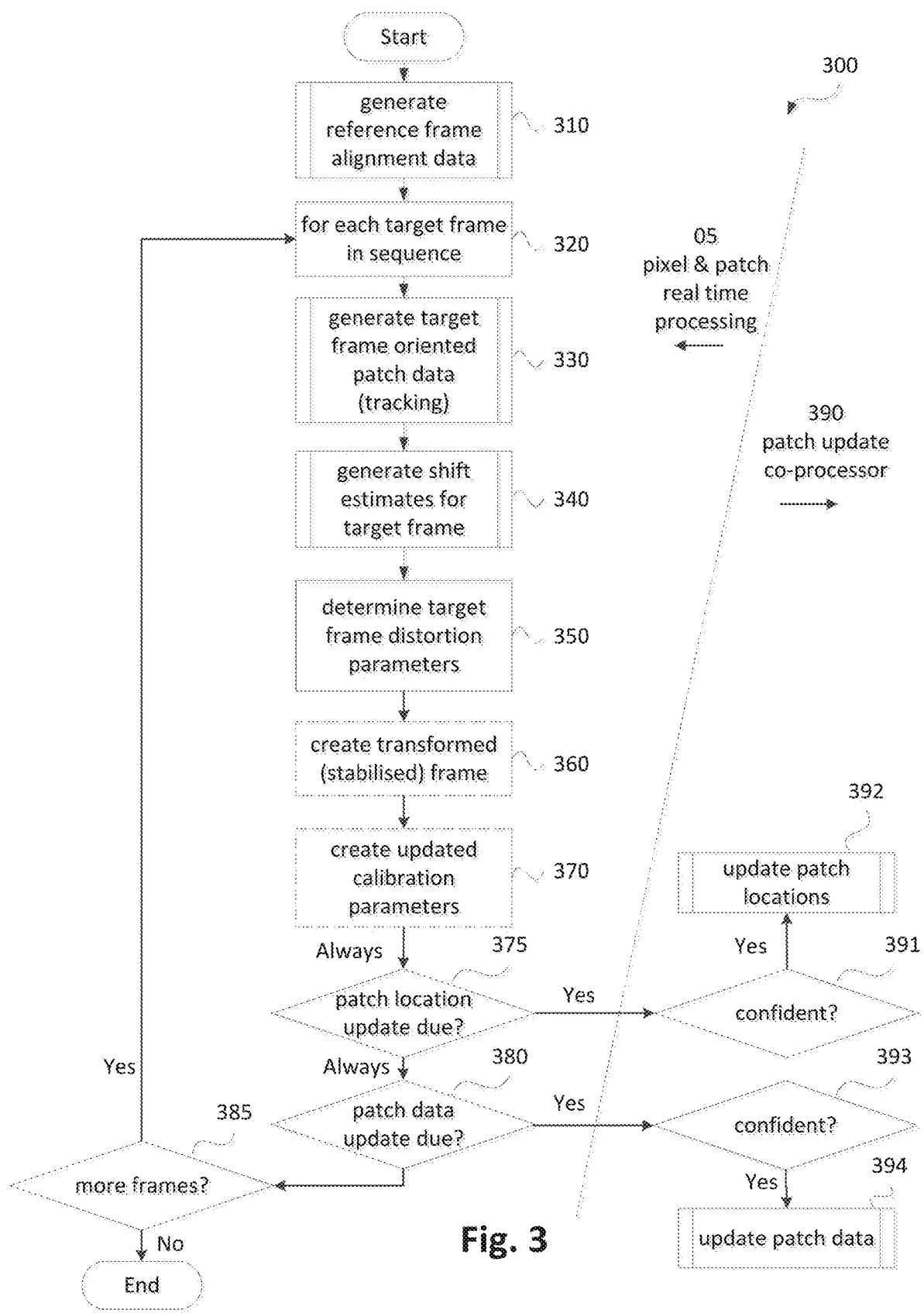
FIG. 3 is a schematic flow diagram showing a method of detecting changes in camera calibration parameters of an input image.

The method 300 in FIG. 3 consists of an initialisation step that analyses a reference frame to generate alignment data, and of an ongoing per frame alignment step that processes a target frame from the camera 120A. In some implementations, the initialisation step may be updated periodically during operation.

The method 300 begins at receiving step 310, where a reference frame received from the image sensing device 110, under execution of the processor 105, is processed to generate reference alignment data. The reference frame may be in a number of formats. In one arrangement, the reference frame is uncompressed. However, in some implementations some compression may have been used on the reference frame. The reference frame may optionally have been preprocessed, for example to convert the reference frame to a particular colour space such as RGB or YUV. The reference frame may have been modified to compensate for camera aberrations such as barrel distortion. However, in one arrangement, the reference frame is supplied with distortion parameters of the camera 120A. The distortion parameters of the camera 120A may include parameters defining an interpolation function such as polynomial, rational or piecewise-linear. The reference frame may be stored in RAM (e.g. 170) and processed locally using processor 105. Alternatively, the reference frame may be sent for processing to another location such as a central server where step 310 may be executed.

The reference frame is processed to generate reference alignment data consisting of a set of oriented projected patch information, referred to as oriented patch data, suitable for alignment analysis to detect changes in the calibration parameters of the camera 120A corresponding to other captured image frames. Each oriented patch may include data corresponding to the position, direction, and projected profile data (in either real or transformed space such as Fourier space) of a single patch in the reference frame. The projected profile data may be generated by a projection operation along a direction substantially perpendicular to the direction of the patch. A method 400 of generating reference alignment data, as executed at step 310, will be described in further detail below with respect to FIG. 4. Oriented patch data of the reference alignment data may be stored within an oriented patch data region 1500 (see FIG. 15) of the RAM 170 used to store the intermediate values 174 as will be described below with respect to FIG. 15.

During processing of target frames according to the method 300, some oriented patch data of the reference alignment data originally generated using pixel data from the reference frame may be replaced by oriented patch data from aligned target frames. To facilitate the replacement of the data, in one arrangement, the storage for oriented patch data of the reference alignment data may be divided into two portions. A first storage portion may be labelled as an "active" portion. The active portion is the portion of the storage that contains the reference alignment data which is being actively used by the method 300. The second storage portion may be labelled as an "inactive" portion. The inactive portion of the storage is updated at step 1470 of a method 1400 which will be described in detail below with respect to FIG. 14. By separating the patch data into active and inactive portion, the method 1400 may operate in parallel with the method 300.

A discriminator value may be associated with each portion of the oriented patch data storage. The discriminator value may be used by method 900 to determine which of the two patch data storage regions is the "active" region. An example of a discriminator value is a monotonically increasing generation number that is increased each time that the oriented patch information is updated by the update patch data step 394. Another form of discriminator value may be a monotonically increasing frame number of the second candidate frame from which the updated oriented patch data was generated.

A confidence metric may be associated with each oriented patch. The confidence metric may be used to select patches that are less likely to provide useful alignment information and are therefore suitable for rejection and replacement with new patches. The confidence metric may be defined as a parameter that is normalised to the range zero (0) to one (1), where zero (0) is the lowest and one (1) is the highest confidence. At initialisation, the confidence metric for all patches may be set to a neutral value such as 0.5. Alternatively, the confidence metric may be initialised based on some value determined based on the oriented patch data such as peak ratio discussed below in relation to step 550 or the edge strength discussed in relation to step 420.

Additionally, a frame confidence metric may be maintained for each frame throughout the alignment of a sequence of frames that gives a measure of confidence in a current distortion estimate. The frame confidence metric may be used to determine whether the frame alignment to the reference frame is sufficiently accurately known to be used for various purposes such as the selection of updated patch data to replace some of the patch data from the current set. The frame confidence metric may be defined as a parameter that is normalised to the range zero (0) to one (1), where zero (0) is the lowest and one (1) is the highest confidence. The frame confidence metric may be initialised to zero.

Once the reference alignment data (i.e. the set of oriented patch data for all oriented patches) has been generated for the reference frame, a loop structure starting at step 320 is used to process a sequence of frames received from the image sensing device 110 under execution of the processor 105. As for the reference frame, each frame may be in a number of formats described above. However, in one arrangement, each of the frames received from the image sensing device 110 may have the same format as the reference frame.

In one arrangement, the subsequent processing of method 300 is performed on two separate processing units (or processors). In one arrangement, one of the processing units used to perform the subsequent processing of method 300 is the processing unit 105. In one arrangement, each of the processing units used to perform the subsequent processing of method 300 may be part of the camera 120A. In other arrangements, each of the processing units used to perform the subsequent processing of method 300 may be separate from the camera 120A.

The first processing unit is the processing unit 105 that processes the input image frames in real time with low latency according to steps 320 to 385 to the left of a dashed line shown in FIG. 3. As will be described below, the method 300 includes a key step 340 that may in turn be split into pixel stream processing 1080 and patch processing 1090. The second unit is co-processor 390 that generates updated patch locations and oriented patch data for patches from specific target frames referred to as candidate frames according to steps 391 to 394 to the right of the dashed line. The updated patch locations and oriented patch data are used to update the stored alignment data that was originally generated for the reference frame at step 310.

An input frame received at step 320, referred to as a target frame, may be stored in RAM 170 at step 320. However, in the arrangement of FIG. 3 the pixels of the input frame are processed in real time as the pixels are produced by the sensor 110 without reference to frame storage (in step 340 described below). A stored frame may be required at optional step 360 to create a transformed (stabilised) frame.

The first processing step of the loop structure used to process the sequence of frames is generating step 330, where oriented patch data is generated for the target frame, under execution of the processor 105. The oriented patch data is generated by determining a location and a direction for each patch of the target frame based on tracking of corresponding patches in the reference frame without processing pixels of the target frame. Location and direction may be generated for each patch and a predetermined pixel transform. However, the pixel projection is not formed at step 330. Tracking executed at step 330 may be based on various data such as shift estimates for oriented patches and/or calibration parameter data from previously processed frames and supplementary motion data from a gyroscope, accelerometer, or other motion sensing device. A method 900 of generating target frame oriented patch data corresponding to oriented patches of the reference alignment data, as executed at step 330, will be described in further detail below with respect to FIG. 9.

Processing then continues to generating step 340, where pixel projection data is generated for the target frame oriented patches, under execution of the processor 105. The pixel projection data is used to determine shift estimates relative to the reference frame at each oriented patch. The pixel projection data may also be used to determine which of the patch shift estimates may be considered as valid. A method 1000 of determining patch shift estimates, as executed at step 340, will be described in further detail below with respect to FIG. 10. In the arrangement of FIG. 3, pixel processing for the detection of calibration parameter changes occurs in step 340. Step 340 may be implemented using hardware acceleration in a form of ASIC or FPGA hardware module. However, as described above, step 340 may also be implemented using the general purpose processor 105.

Next, at determining step 350, the target frame distortion parameters are determined based on the target frame oriented patch data from step 330 and the corresponding shift estimates from step 340. In one arrangement, only the patches with valid shift estimates are considered at step 340. In one arrangement, the frame distortion parameters are the parameters of a simple functional transform that defines the mapping of pixels in the target frame to pixels in a transformed stabilised frame. Suitable functional transforms include translation, RST (rotation scaling and translation) affine and projective transforms.

The projective transform may be defined in terms of a set of three (3) rotational parameters based on the assumption that the variation in the position of the camera 120A is negligible, and the intrinsic parameters of the camera 120A do not change. Consider Equation (1) for a feature in world space (X, Y, Z) that maps to a pixel coordinate $(u_r, v_r)$ in the reference frame and pixel coordinate $(u_t, v_t)$ in the target frame based on a change in the rotation matrix only. The transformation defined in accordance with Equation (3), below, can be derived:

$$\begin{bmatrix} u_r \\ v_r \\ 1 \end{bmatrix} \propto R_{cr} \cdot \begin{bmatrix} u_t \\ v_t \\ 1 \end{bmatrix} \qquad (3)$$

where $R_{cr}=R_r R_c^{-1}$ defines the relative rotation of two cameras which may be expressed as a quaternion q=a, b, c, d. Three rotational parameters (related to tilt, pan and roll, respectively) may be expressed in terms of the quaternion parameters as (t=b/a, p=c/a, r=d/a). The matrix $R_{cr}$ may be expressed, in accordance with Equation (4), as follows:

$$R_{cr} = \begin{bmatrix} 1+t^2-p^2-r^2 & 2(tp-r) & 2(tr+p) \\ 2(tp+r) & 1-t^2+p^2-r^2 & 2(pr-t) \\ 2(tr-p) & 2(pr+t) & 1-t^2-p^2+r^2 \end{bmatrix}, \qquad (4)$$

which for small angles approximates to Equation (5), as follows:

$$R_{cr} \approx \begin{bmatrix} 1 & -2r & 2p \\ 2r & 1 & -2t \\ -2p & 2t & 1 \end{bmatrix}. \qquad (5)$$

Each oriented patch in the target frame is associated with a location $(u_t, v_t)$ (that may vary based on step 330) and a shift estimate, referred to as $\Delta w_m$. An estimated location in the reference frame, $(u'_r, v'_r)$, may be obtained using the rotation matrix $R_{cr}$ for any given set of rotation parameters (t, p, r) according to Equation (3).

In order to determine the estimated location, the scaling parameters in Equation (3) are chosen so that the equality is met. Next, the expected offset, $(\Delta u, \Delta v)$, between the estimated location in the reference frame and the position of the patch in the target frame, $(u_t, v_t)$, is determined. The offset $(\Delta u, \Delta v)$ may be transformed to a scalar offset $\Delta w$ along the projection axis of the oriented patch by taking the dot product with a unit vector along the direction of projection axis of the oriented patch. If the transform is accurate, the scalar offset should be very close to the shift estimate between the reference and target oriented patches determined at step 340.

For a set O of N oriented patches consisting of the patches indexed i where i∈1, . . . , N, it is possible to set up an error metric as a function of the rotation parameters (t, p, r) based on the differences between the scalar offset and the shift estimates. For example, a simple sum of square error metric may be determined in accordance with Equation (6), as follows:

$$E(t, p, r; O) = \sum_{i=1}^{N} (\Delta w - \Delta w_m^j) \tag{6}$$

where the value of scalar offset $\Delta w$ along the projection axis of the oriented patch is a function of the three rotation parameters. Rotation parameters may be determined by minimising the error function in accordance with Equation (7) as follows:

$$(t,p,r) = \arg_{t,p,r} \min(E(t,p,r;O)) \tag{7}$$

The solution to Equation (7) may be determined using a standard non-linear least squares minimisation method such as Gauss-Newton. In general, a suitable starting point for the minimisation is the origin, as the expected rotation is zero (knowledge about the expected motion was included in the tracking step). Alternatively, starting point may be chosen as a solution of Equation (5) obtained using linear least squares method. A fixed number of three (3) to five (5) iterations of the Gauss-Newton method may be used. Furthermore, if the rotation has been simplified to a linear form, it may be possible to set up a linear set of equations and solve directly using a matrix inversion.

The accuracy of the estimated rotation parameters in the presence of outliers may be improved by using a more robust estimator such as the RANSAC method. In the case where such as a robust estimator is used, small sets of oriented patches are selected at random and used to form a best fit, and this fit is applied to the full set of oriented patches to determine a set of inliers which are considered close enough to the estimated transform (i.e. for which the shift estimate is close enough to the scalar offset). The determination of the set of inliers is made by comparing the difference between measured offset and the offset obtained from the estimated transform with a fixed predetermined threshold. In one arrangement, the fixed predetermined threshold may be specified as being greater than zero (0) and less than five (5) pixels. The selected parameter set is the parameter set for which the number of inliers is greatest. The estimated rotation parameters may then be determined using a linear least squares over a selected set of inliers.

The method of determining the distortion parameters may be implemented using other transforms such as translation, RST (rotation scaling and translation), affine and more general projective transforms.

An acceptance test may be performed for the estimated rotation parameters. The acceptance test may use information relating to the set of inliers and outliers, the magnitude of the distortion according to the estimated parameters, or other information. For example, the estimated rotation parameters may be rejected if either of the following criteria is met:

the maximum shift of the determined transform at any of the inlier patches is greater than half the patch size; or
the number of inliers is less than six (6) plus one tenth of the number of valid patches described with reference to step 1070 below (e.g. for the case of forty (40) valid patches the threshold is ten (10)).

Additionally, the confidence metric of the individual patches may be updated based on the consistency between shift measures and the best fit distortion transform. For example, if patch i has confidence $q_i$ at time $t_{j-1}$ then the confidence at time $t_j$ may be updated according to whether the patch is considered as an inlier in robust best fit transform estimation in accordance with Equation (8), as follows:

$$q_i(t_j) = \begin{cases} (1-f)q_i(t_{j-1}) & \text{not inlier} \\ f + (1-f)q_i(t_{j-1}) & \text{inlier} \end{cases} \tag{8}$$

where f is the confidence fractional patch confidence update parameter for which a suitable value may be 0.05. The update of the confidence metric of the individual patches in accordance with Equation (8) increases the confidence of inliers and reduces that of outliers.

The frame confidence metric may also be updated at each frame according to whether or not the fit was acceptable. For example, the frame confidence metric may be updated according to Equation (9), as follows:

$$c(t_j) = \begin{cases} (1-g)c(t_{j-1}) & \text{not acceptable} \\ g + (1-g)c(t_{j-1}) & \text{acceptable fit} \end{cases} \tag{9}$$

where g is the fractional frame confidence update parameter for which a suitable value may be 0.2. The update of the frame confidence metric in accordance with Equation (9) increases the confidence when an acceptable fit has been found.

Any other suitable method of defining a distortion map from the set of shift estimates may be used at step 350 depending on accuracy requirements of alignment. Such other suitable methods include interpolation methods that form a dense distortion map from the sparse set of shift estimates. The method of defining a distortion map used at step 350 should be capable of extrapolation outside the convex hull defined by the set of oriented patches. One suitable method of defining a distortion map may use radial basis functions.

Processing then continues to creating step 360, where a transformed (stabilised) frame is created, under execution of the processor 105. The target frame distortion parameters from step 350 may be used to define a warp map and an associated image transform operation that maps pixels in the target frame to pixels in a transformed stabilised frame. As described above, in general, the mapping does not map pixels of the stabilised frame from exact pixel locations in the target frame. Therefore, some form of interpolation may be used in order to generate an accurate stabilised frame. In one arrangement, a cubic interpolation method may be used to generate an accurate stabilised frame as the cubic interpolation method provides a good trade-off between accuracy and computational complexity.

The stabilised frame may optionally be compensated for geometric aberrations such as barrel distortion if parameters are supplied corresponding to the target frame. Compensating for geometric aberrations may involve a nonlinear distortion or image warp of the target frame image data according to the distortion model for the camera 120A (parameterised according to the distortion parameters). The nonlinear distortion may be applied after the image stabilisation distortion, or may be combined with the image stabilisation and applied in a single image transform operation. Combining the distortions and applying as a single transform has the advantage of maintaining a higher accuracy in the generated stabilised image as only a single interpolation step is required. As described above, any suitable method for combining warp maps may be used, and the method of combining warp maps may require interpolation of the warp map data.

Next, the method 300 continues to creating step 370 where updated calibration parameters corresponding to the camera 120A may be optionally created based on the target frame. Where the frame distortion parameters correspond to a projective transform defined by three rotational parameters described above, the rotation matrix for the extrinsic parameters of the target frame $R_c$ may be determined by multiplying the known reference frame rotation matrix $R_r$ by the inverse of the rotation correction matrix $R_{cr}$ determined in step 350 above, in accordance with Equation (10), as follows:

$$R_c = R_{cr}^{-1} \cdot R_r \qquad (10)$$

Processing continues from step 370 to decision step 375, where a determination is made, under execution of the processor 105, as to whether a patch location update is due at the current frame. Patch location updates may be due on a predetermined schedule, on an ad-hoc basis depending on previous alignment results, or based on an external input such as a request from a user. For example, patch location updates may be due every fixed number of frames after an initial patch update scheduled timeframe. Suitable patch location update times may depend on the processing speed of patch location and data update, environmental conditions, and the frame rate. A suitable patch location update rate may be every minute in a typical configuration. A new set of patch locations is not be generated (i.e. a patch update is not due) if a set of updated patch locations has been generated previously for which updated oriented patch data has not yet been generated.

Regardless of whether a patch location update is determined to be due at step 375, processing on the pixel and patch real-time processing always continues to decision step 380 so that processing of target frames is continuous and ongoing and so that real time stabilisation is possible. In the case that a patch location update is due, then processing continues to decision step 391, where a determination is made, under execution of the processor 105, as to whether the frame confidence is high. A suitable condition for step 380 is that the current frame confidence metric is above a threshold (a suitable threshold being 0.83). If the frame confidence is high, then processing continues to updating step 392. Otherwise, no further processing is required for patch location updates.

At step 392, a patch location update is performed, under execution of the co-processor 390, using the current frame image, referred to as the candidate frame. The candidate frame is passed from the real-time processing unit 305 to the patch update co-processor 390. The candidate frame may be in its original form, or may be a transformed (stabilised) frame from step 360. A method 400 of generating updated patch locations, as executed at step 392, will be described in further detail below with respect to FIG. 4.

As described above, regardless of whether a patch location update is due at step 375, processing on the method 300 always continues to step 380 where a determination is made as to whether a patch data update is due. The update is considered as due if a new set of patch locations has been generated from step 392 that have not yet been processed by step 394. Regardless of whether a patch location update is due, the method 300 always continues to decision step 385 so that processing of target frames is continuous and ongoing and so that real time stabilisation is possible. In the case that a patch data update is due then processing continues to decision step 393 which checks whether the frame confidence is high based on the same or a similar condition to that used at step 391. If the frame confidence is high then processing continues to updating step 394. Otherwise, no further processing is required for patch data updates.

At step 394, a patch data update is performed, under execution of the co-processor 390, using the current frame image, also referred to as the candidate frame and a set of previously generated updated patch locations from step 392. The candidate frame used at step 394 is not the same candidate frame as the candidate frame used at step 392, due to the fact that step 392 typically runs at a much slower rate than the frame rate associated with the real time processing thread 305. The candidate frame used at step 394 may therefore be referred to as a second candidate frame.

The second candidate frame is passed from the real-time processing unit 305 to the patch update co-processor 390. The second candidate frame may be in its original form, or may be a transformed (stabilised) frame from step 360. The updated patch locations at this stage are considered to be in the same frame as the current frame. A method 1400 of generating updated patch data, as executed at step 394, will be described in further detail below with respect to FIG. 14.

As described above, regardless of whether a patch data update is due at step 380, the method 300 always continues to decision step 385. At step 385, if there are more frames to process, then the method 300 returns to step 320. Otherwise, if there are no further frames to process, then the method 300 ends.

Figure 4:
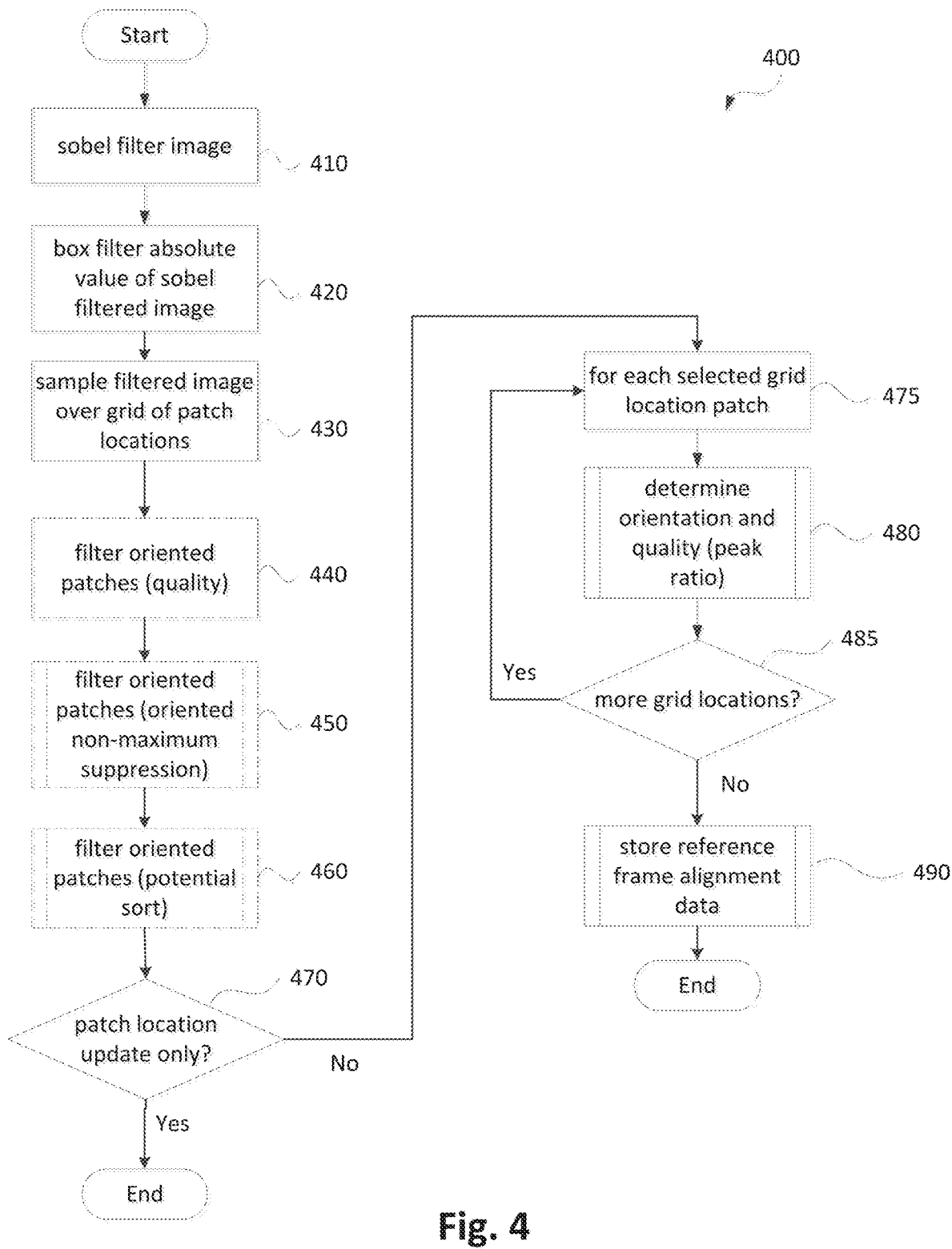
FIG. 4 is a schematic flow diagram showing a method of generating patch locations or patch location and patch data for a reference frame or a candidate frame.

The method 400 of generating reference alignment data, as executed at step 310, will be described in further detail below with respect to FIG. 4. The frame alignment data generated in accordance with the method 400 may be in the form of a set of oriented patch data. The method 400 is also used at step 392 in order to perform a patch location update only in which case the method 300 terminates early and may generate only location information and not oriented patch data.

As discussed with reference to step 310, the method 400 receives as input a reference frame that may be stored in RAM 170 in a known format, and may optionally receive distortion parameters corresponding to the image capture. The method 400 may be implemented as one of more software code modules of the software application program 133 resident in the storage module 109, and being controlled in its execution by the co-processor 390. In other implementations, all or parts of the processing may be performed on dedicated hardware. In particular, steps 410 to 440 of the method 400 to be described may be performed on dedicated hardware in order to improve performance.

The method 400 may be used for two purposes. Firstly, the method 400 may be used at step 310 to produce reference alignment data consisting of a set of oriented patch data suitable for alignment analysis to detect changes in the calibration parameters of the camera 120A corresponding to other captured image frames. Each oriented patch may include the position, direction, and projected profile data (in either real or transformed space such as Fourier space) of a selected patch from the reference frame image. The projected profile data may be generated by a projection operation along a direction substantially perpendicular to the direction of the patch. Secondly, the method 400 may be used at step 392 to generate an updated set of patch locations from a candidate frame.

The method 400 starts at filtering step 410, where a grid of patch locations is generated, under execution of the co-processor 390, for analysis. In one arrangement, HD image frames are processed in accordance with the method 400. However, as discussed above, the described methods may be adapted to other frame formats such as SD, 4K and 8K.

Patch size is selected so as to encompass the width of the typical linear features in the image and to provide sufficient margin to accommodate expected shifts between two consecutive frames. A patch size of sixty-four (64) pixels is selected as a default value for HD video frames. The grid of locations is typically densely populated. For example, if patch alignment data with a patch size of sixty-four (64) pixels is to be selected, then evenly distributed patch locations on a grid where the spacing (i.e. the gap between adjacent patches) is between thirty-two (32) and one twenty eight (128) pixels may be considered. In the case that distortion parameters are supplied to the method 400, the grid may be sampled uniformly in an undistorted space then the known functional form of the transform and the transform parameters may be used to map to a non-uniform grid in the reference frame space.

Also at step 410, two Sobel filters are passed over a downsampled greyscale version of the current frame image to generate edge representations of the original image oriented according to the x- and y-axes. The downsampling may be by a factor of four (4) and may use an appropriate smoothing step to avoid aliasing. The Sobel filter used at step 410 is a separable 3×3 filter that may be implemented in an efficient manner and is defined in accordance with Equations (11), as follows:

$$G_x = \begin{bmatrix} 1 & 0 & -1 \\ 2 & 0 & -2 \\ 1 & 0 & -1 \end{bmatrix}, G_y = \begin{bmatrix} 1 & 2 & 1 \\ 0 & 0 & 0 \\ -1 & -1 & -1 \end{bmatrix}. \quad (11)$$

At a next filtering step 420, the two filtered Sobel filter edge representations are combined, under execution of the co-processor 390, by taking the square root of the sum of squares of the individual Sobel filter edge representations (i.e. the Sobel filter edge representations are combined in quadrature). The result of step 420 is a single downsampled image that represents the edge strength in the reference image without considering the edge orientation. A box filter is applied to the downsampled image at step 420 to form an image that represents the amount of edge information in a region around each pixel of a size corresponding to the alignment algorithm patch size. The values determined using the box filter may be referred to as the edge strength. The downsampled image determined at step 420 is then sub-sampled onto a grid corresponding to the centres of the grid of patch locations in the x- and y-axes.

Then at sampling step 430, an approximate angle for the edge at each grid location is formed, under execution of the co-processor 390, from the two Sobel filter edge representations (x- and y-axis) at each grid point. If the values of the edges are given by gx and gy then the angle is approximated in accordance with Equation (12), as follows:

$$\theta = \arctan(g_y, g_x). \quad (12)$$

Next, a series of optional processing steps 440 to 460 are used, under execution of the co-processor 390, to filter the set of oriented patches. As the number of patches increases, so does the processing cost. However, the processing cost is offset by benefit of increasing accuracy of estimation of calibration parameters. The steps 440 to 460 are configured to select a set of patches to give acceptable accuracy with a minimum number of patches. Alternative filtering methods to those described in steps 440 to 460 may be considered at this stage of processing.

At filtering step 440, the set of oriented patches may be filtered according to quality, where quality is defined by the edge strength. A suitable method for filtering the set of oriented patches according to quality is to select a threshold for the quality parameter of each patch and to reject any patches with a lower quality than the threshold. The value of the threshold depends on the expected performance of the camera 120A, and the environment. In one arrangement, the threshold may be set according to the distribution of edge strength over the image. For example, the threshold may be set to the 20% percentile of the distribution in order to filter out 20% of the patches.

At filtering step 450, the set of oriented patches may be optionally filtered using an oriented non-maximum suppression process. A method 600 of selecting candidate patches using non-maximal suppression, as executed at step 460, will be described in more detail below with reference to FIG. 6.

Next, at filtering step 460, the set of oriented patches may be further filtered using a potential sort process. A method 700 of filtering candidate patches using potential sort, will be described in more detail below with reference to FIG. 7.

Following the patch filtering, at decision step 470, if patch location updates are being performed (e.g., if the method 400 was called from step 392 of method 300), then processing completes and the method 400 ends, having generated only patch location data. Otherwise, (e.g., when method 400 was called from step 310 of the method 300 to generate reference alignment data), processing continues from step 470 to step 475.

A loop structure is used starting at selecting step 475 to determine reference direction and quality information for patches at each grid location. At selecting step 475, a next grid location is selected, under execution of the processor 105 and may be stored in the RAM 170.

The method 400 continues at determining step 480, where reference direction (or orientation) and quality information is determined for the patch at the grid location selected at step 475. A method 500 of determining patch direction and quality information, as executed at step 480, will be described in more detail below with reference to FIG. 5.

In one arrangement, the quality parameter returned at step 480 is a peak ratio which takes a higher value for patches considered of a higher quality. Next, at decision step 485, if there are more grid locations to analyse, then the method 400 returns to step 475. Otherwise, all locations have been analysed and processing continues to storing step 490. The processing of individual grid locations in the loop structure starting at step 475 may be suitable for acceleration by parallel processing.

At step 490, the reference alignment data is stored in RAM 170, for example. The reference alignment data is stored in the form of the oriented patch data determined at step 480. The oriented patch data is extracted and stored at step 480. A method 800 of extracting oriented patch data, as executed at step 490, will be described in detail below with reference to FIG. 8.

Figure 5:
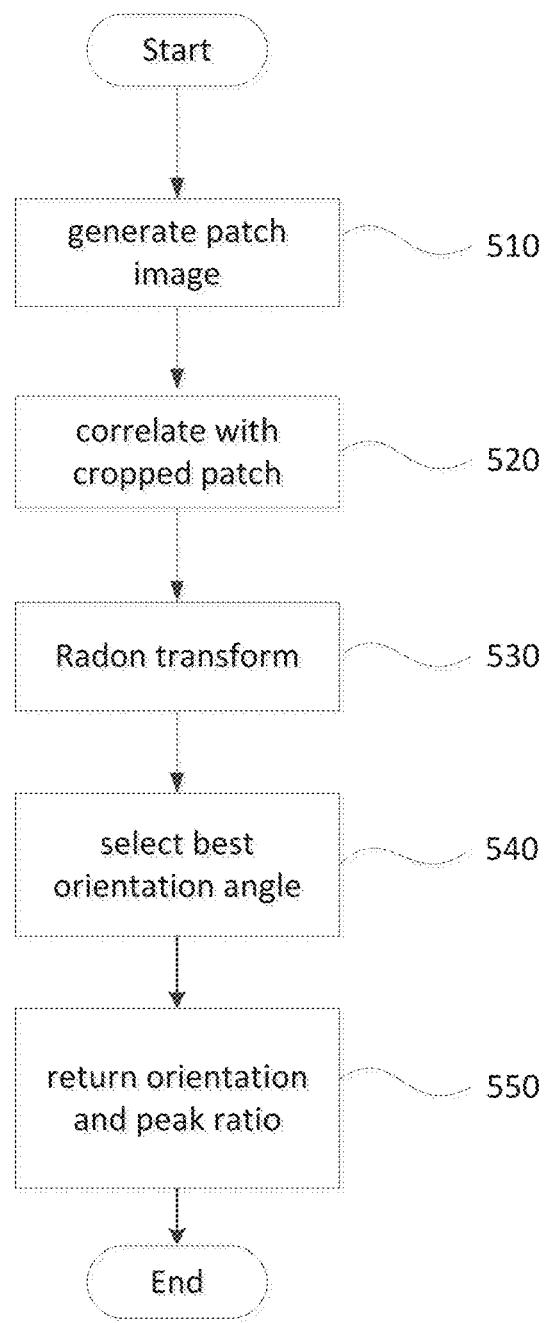
FIG. 5 is a schematic flow diagram of a method of determining patch direction and peak ratio.

The method 500 of determining patch direction and quality information (peak ratio) for a patch at a given location suitable for use at step 430 of method 400, will now be described in more detail with reference to FIG. 5. The method 500 may be implemented as one or more software code modules of the software application program 133 resident in the storage module 109 and being controlled in its execution by the co-processor 390 configured within the camera 120A.

The method 500 begins at generating step 510, where a patch image of twice the predefined patch size is generated from the reference or candidate frame at the given location, under execution of the co-processor 390. For example, patches of width and height given by one hundred and twenty eight (128) pixels for the suggested patch size of sixty-four (64) pixels referred to in step 410 above, may be generated at step 510. The patch image may be generated directly from a copy of the reference image stored in the RAM memory 170. In the case that a distortion model and corresponding distortion parameters were supplied for the reference or candidate frame, the reference patch image may optionally be warped according to the model to remove the camera distortions. The expected output of step 510 has a single channel. The single channel may be a luminance or greyscale channel. However, the single channel may alternatively be any individual channel of the reference image (e.g., the green channel in the case of RGB frame pixel data).

Next, at correlating step 520, the image patch is correlated with a cropped version of the image patch, under execution of the co-processor 390, to determine correlation data. The correlation data determined at step 520 may be stored in the memory 170. The cropped version of the image patch is half the size of the original image patch (i.e. the cropped version of the image patch has width and height given by the patch size), centred at the centre of the original patch image. Prior to performing the correlation at step 520, the mean value is subtracted from each patch and a suitable hedging function is used to smooth the signal near the patch image boundaries in both dimensions. Hedging functions that may be used at step 520 include raised cosine, squared cosine. A Hann window with parameter 0.25 may also be used at step 520. The cropped window may be padded symmetrically with zeros back to the original patch size. The correlation may be efficiently performed in the Fourier domain by performing a Fourier transform operation on both patches, taking the complex conjugate of the cropped window patch, multiplying together the transformed images, and then transforming back to real space. A filter may be used to the product of the patches in Fourier space to boost high frequency components of the spectrum that may yield improve alignment accuracy in later stages of processing. A power function of the form $|f|^n$ can be used as a filter with n is in range of 1 to 3.

The method 500 continues at transforming step 530, where a Radon transform is performed on the correlation data. The transformed data describes the correlation data as a 2D function of offset and angle. The Radon transformed data, represented in a polar coordinate space, may be stored in the memory 170 under execution of the co-processor 390.

Next, at selecting step 540, the Radon transformed data is analysed to select the patch reference direction. The patch reference direction is determined by determining the highest peak along the 1D slice corresponding to all possible angles and zero offset. A 1D slice representing the set of values of the Radon transform over all possible offsets for the chosen angle (reference direction) is then analysed. The height ratio of the highest peak to the next highest peak at the same angle gives a measure of quality that will be referred to as the peak ratio. The angle of the slice with the highest peak ratio quality metric is selected as the patch reference direction.

Following the selection at step 540, the method 500 proceeds to storing step 550, where the selected patch reference direction and corresponding peak ratio quality metric are returned to step 430 of the method 400. The selected patch reference direction and corresponding peak ratio quality metric may also be stored in the RAM 170.

Figure 6:
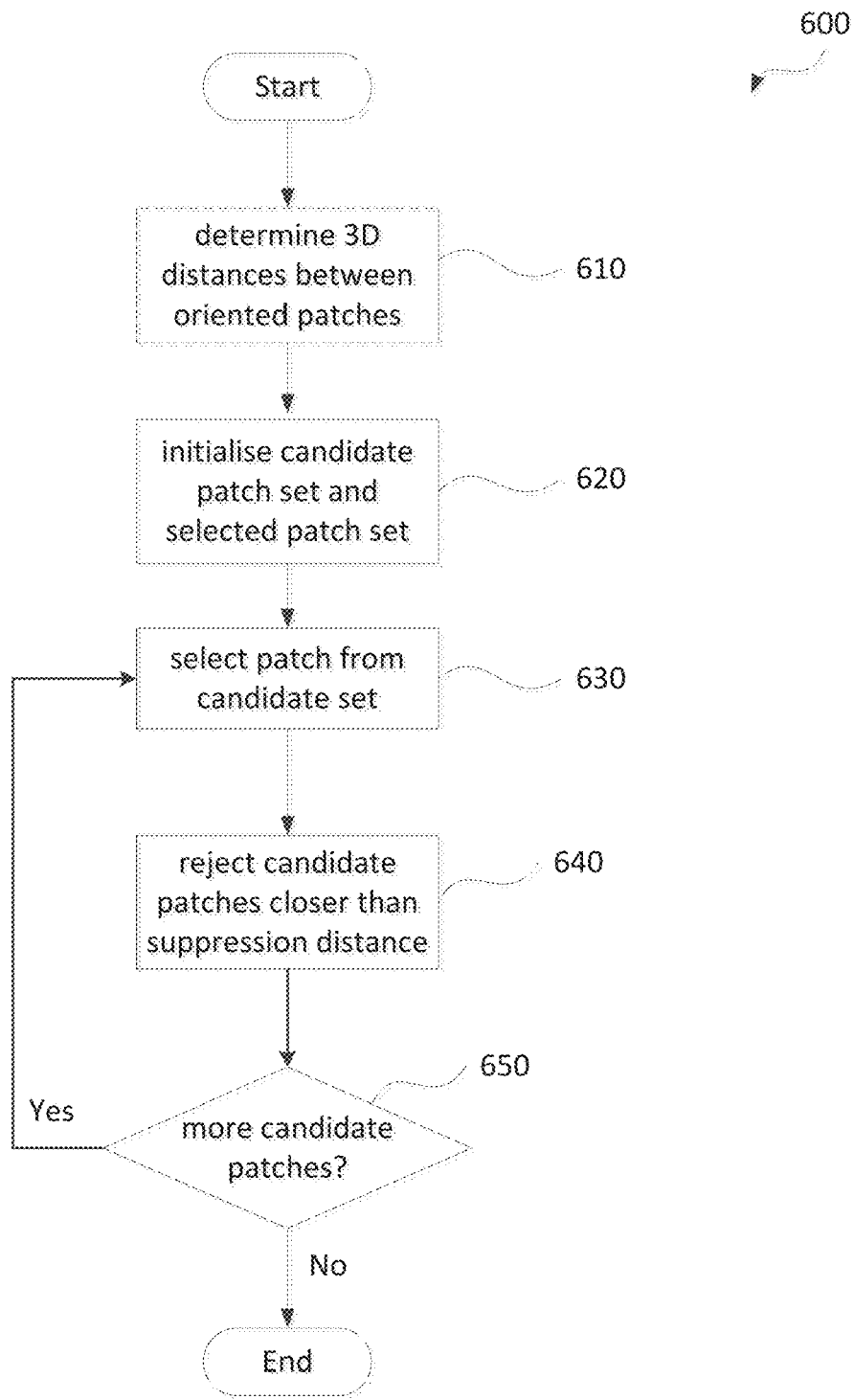
FIG. 6 is a schematic flow diagram of a method of selecting candidate patches using non-maximal suppression.

The method 600 of selecting candidate patches using non-maximal suppression, as executed at step 460, will described in detail below with reference to FIG. 6. The method 600 filters the set of oriented patches using an oriented non-maximum suppression process. The method 600 may be implemented as one or more software code modules of the software application program 133 resident in the storage module 109 and being controlled in its execution by the processor 105 of the camera 120A.

The method 600 begins at determining step 610, where a distance between each pair of oriented patches in the set of oriented patches, is determined under execution of the co-processor 390 and stored, for example, in the RAM 170. The distance determined at step 610 is a function of pixel distance between the patches and the difference in reference direction. In the arrangement of FIG. 6, the distance metric $d_{i,j}$ used to represent the distance between the ith and jth oriented patches is determined in accordance with Equation (13), as follows:

$$d_{i,j} = \sqrt{(x_i - x_j)^2 + (y_i - y_j)^2 + \delta(\theta_i, \theta_j)^2} \quad (13)$$

where x, y, and θ represent the x and y coordinates and reference direction of the patches and:

$$\delta(\theta_i, \theta_j) = \alpha \tan\left(\beta\left(\pi/2 - \|\theta_i - \theta_j| - \frac{\pi}{2}\|\right)\right) \quad (14)$$

is a suitable function used to describe the distance in reference direction space. The function of Equation (14) is parameterised by the scaling parameter α that controls the relative importance of differences in reference direction relative to differences in position and the parameter β that is set slightly below one (1) to avoid an undefined value of the tan function. In one arrangement, the parameter value α=20 for Equation (14). Alternative functional forms of the distance in reference direction space may be used provided that the alternative functional forms have the same properties of being small for directions that are close to parallel, large for directions that are close to perpendicular, and vary smoothly in between.

Processing then continues to initialising step 620, where a candidate patch set and selected patch set are initialised within RAM 170 under execution of the co-processor 390. The selected patch set is initialised to include a single patch. In one arrangement, the patch with the largest quality metric is selected for the selected patch set. However, a random patch may be selected. The candidate set comprises all other oriented patches that are further than a predefined suppression distance Δ from the selected patch (i.e. the set of patches indexed i for which $d_{i,j} > \Delta$ where j is the index associated with the first selected patch). A suitable value for the suppression distance is one (1) to three (3) multiples of the patch size.

Next, starting at selecting step 630, a loop structure is used to add more patches to the selected patch set from the candidate patch set. At step 630, a patch is selected from the candidate patch set, defined as the patch from the candidate set with the maximum smallest distance to any patch in the selected patch set. The patch selected at step 630 is added to the selected set initialised at step 620. Then, at rejecting step 640, all candidate patches within a predefined suppression distance Δ from the selected patch (i.e. the set of patches indexed i for which $d_{i,j} < \Delta$ where j is the index associated with the most recently selected patch), are removed from the candidate set configured within the RAM 170. At decision step 650, if there are any more patches in the candidate set, then processing returns to step 630. Otherwise, the method 600 concludes. The predefined suppression distance Δ may be optimised for a given set of patches to produce roughly twice a predetermined number of patches after filtering. For example, if one hundred (100) patches are required from the patch selection method 400 then the predefined suppression distance Δ may be optimised to produce two hundred (200) patches.

Various geometric methods, such as octrees, may be used to speed up the method 600. Additionally, the method 600 may be performed several times with different suppression radii to select a suppression radius. The selected suppression radius may correspond to a radius for which the number of selected oriented patches is as close as possible to a predetermined number. The predetermined number may be somewhere in the range from ten (10) to one hundred (100) depending on the environment in which the method 600 is implemented).

Figure 7:
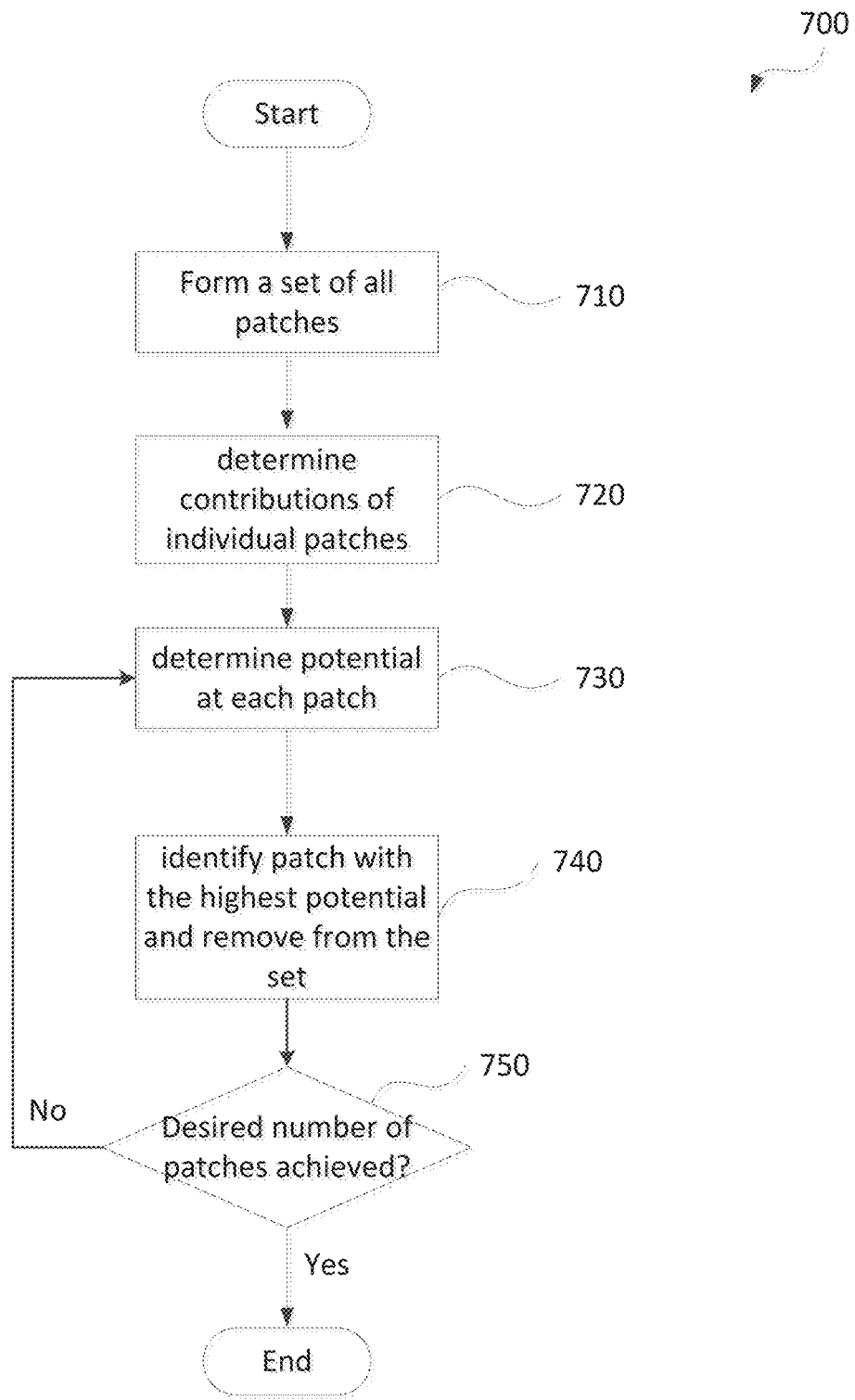
FIG. 7 is a schematic flow diagram of a method of filtering candidate patches using potential sort.

The method 700 of filtering candidate patches using potential sort, will be described in more detail below with reference to FIG. 7. The method 700 filters the set of oriented patches using a potential sort process. The method 700 may be implemented as one or more software code modules of the software application program 133 resident in the storage module 109 and being controlled in its execution by the co-processor 390 of the camera 120A.

Method 700 begins at forming step 710, where an initial set of all patches is formed under execution of the processor 105. Then at determining step 720, a matrix of mutual contributions between patches is determined under execution of the co-processor 390. A contribution of one patch to another may be determined as an inverse power law with respect to distance determined according to Equation (13). In one arrangement, a power factor of negative three (−3) may be used.

Then at determining step 730, contributions from all other patches in the set are summed up to form a patch potential value for a given patch in the set of patches. At identifying step 740, a patch with the highest potential is identified and removed from the set of patches. Then at decision step 750, if a predetermined desired number of patches is obtained then the method 700 concludes. A suitable predetermined number of patches may be one hundred (100). Otherwise, the method 700 returns to step 730. The desired number of patches may be somewhere in the range from ten (10) to one hundred (100) depending on the environment in which the method 700 is implemented.

Figure 8:
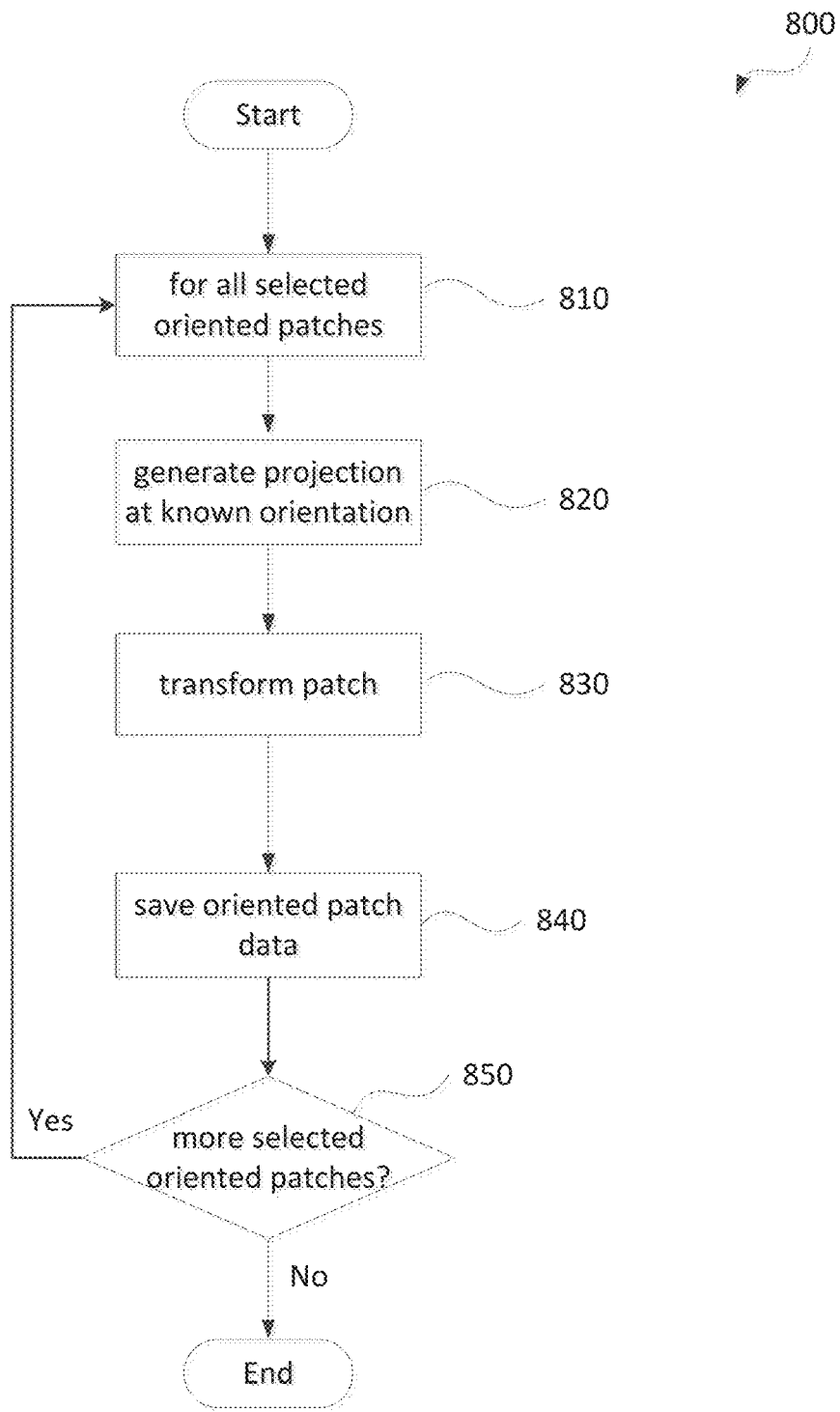
FIG. 8 is a schematic flow diagram of a method of extracting patch data.

The method 800 of extracting oriented patch data, as executed at step 480, will now be described with reference to FIG. 8. The method 800 is executed at step 480 for processing oriented patches from a reference frame and at step 1435 (described below) for processing oriented patches from a candidate frame. The method 800 stores reference alignment data in the form of a set of oriented patch data.

The method 800 may be implemented as one or more software code modules of the software application program 133 resident in the storage module 109 and being controlled in its execution by the co-processor 390 of the camera 120A.

Method 800 uses a loop structure beginning at selecting step 810 to process each oriented patch in the selected set of oriented patches in turn. At step 810, a first patch is selected from the set of oriented patches under execution of the co-processor 390.

Then at generating step 820, a projected rotated image patch image is generated at the patch location and reference direction of width and height given by half of the patch size referred to in step 410 (e.g., thirty two (32) pixels). Generating a rotated image patch requires interpolation unless the rotation is a multiple of π/2 radians, which may be performed using cubic interpolation, though other interpolation methods may be used (e.g. linear, sinc, Fourier). The projection operation consists of summing the pixel values from the reference or candidate frame along an axis that is substantially perpendicular to the patch direction. The projected rotated image patch image determined at step 820 may be stored in RAM 170.

In one implementation of step 820, the intermediate rotated patch image is not stored. The projected rotated image patch may be formed by summing values from pixels around the patch location directly into the projection array elements. For example, an empty projection array may be initialised, then pixels in a region around the patch location known to contain the rotated patch (by geometry) may be sampled. Each pixel may be transformed to a location in the rotated patch that will in general be between integer locations along the axis parallel to the reference direction of the patch. According to a selected interpolation scheme the pixel data may be added to the projection array in the integer locations adjacent to location of the corresponding pixel along the parallel axis. The pixel data is added to the projection array with a weighting defined by the value of the interpolation kernel at the offset of the integer location relative to the sub-pixel position of the projected pixel along the projection axis. A discrete Lanczos kernel with support of three (3) to nine (9) pixels may be used as an interpolation function.

In one implementation, the pixels in the reference or candidate frame may be processed as a pixel stream in raster order, considering each pixel once and accumulating projections for all active projections at a scan line. An implementation where the pixels are processed as a pixel stream in raster order is analogous to a method 1000 which will be described in detail below with reference to FIG. 10. As will be described, the method 1000 determines patch shifts from image data. The method 1000 performs a similar analysis of target frame oriented patches, before determining shifts between the reference and target frame oriented patches.

Following step 820, processing then continues to transforming step 830, where the projection array is transformed to accelerate processing during the method 1000 to be described. In the arrangement of FIG. 8, the projection array is offset such that the projection array has a zero mean, then the projection array is multiplied by a suitable one dimensional (1D) hedging function as discussed in step 520 above, and padded symmetrically with zeros so that a width of the projection array matches the patch size. The projection array may then be transformed into frequency domain using a Fast Fourier Transform, pre-multiplied with a 1D version of the filter function as discussed in step 520 and complex-conjugated in preparation for correlation at steps 1050 to 1060 to be described. The transformed projection array, reference direction and location are stored within the RAM 170, for example, at storing step 840. Then at decision step 850, if there are more selected oriented patches to analyse, the method 800 returns to step 810. Otherwise, method 800 concludes.

A method 900 of generating target frame oriented patch data corresponding to reference alignment data oriented patches, as executed at step 330.

Figure 9:
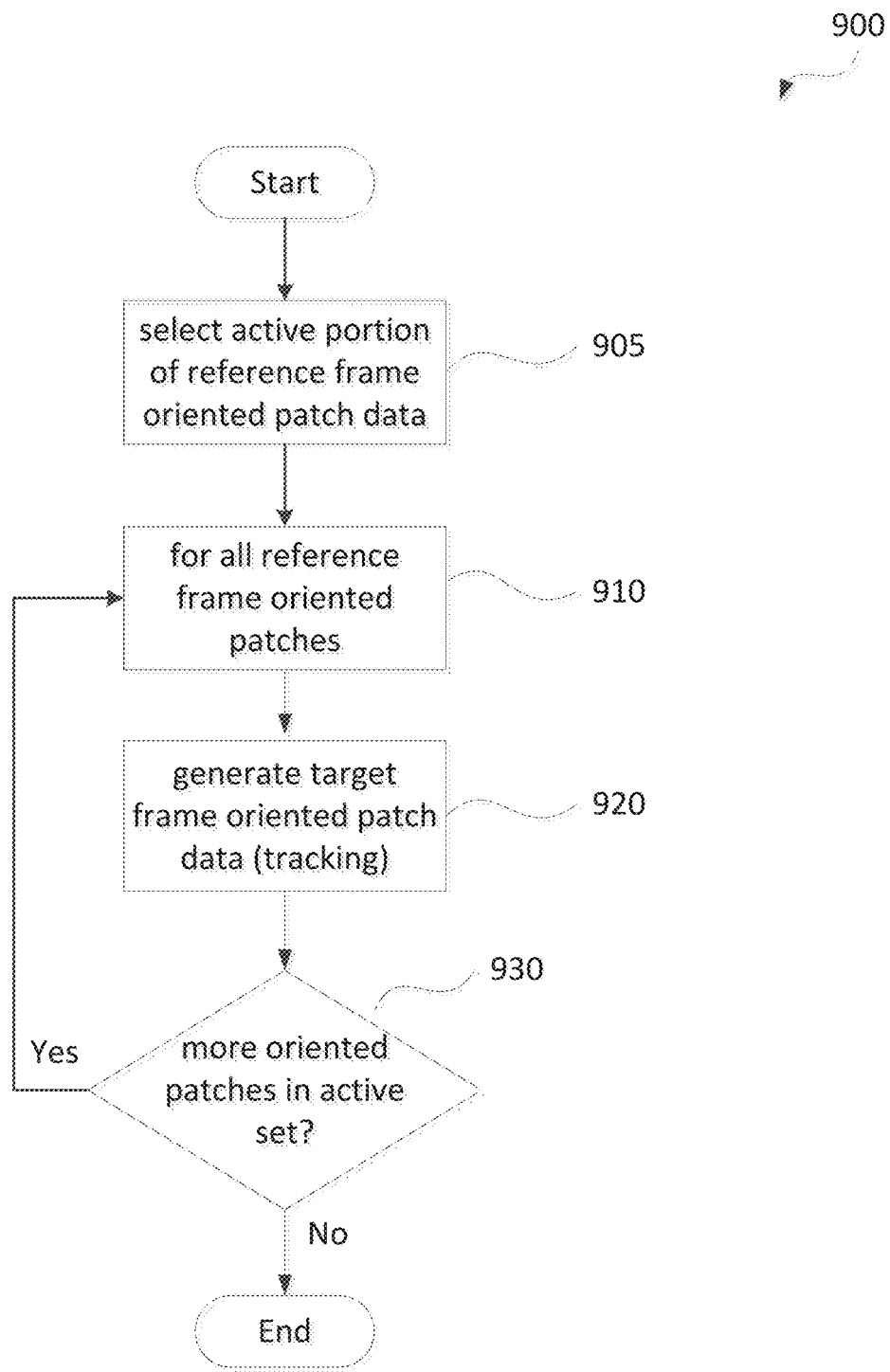
FIG. 9 is a schematic flow diagram of a method of generating target frame oriented patch data corresponding to reference or candidate frame oriented patches.

The method 900 of generating target frame oriented patch data corresponding to the reference alignment data oriented patches selected at step 310, will now be described in further detail with respect to FIG. 9. The method 900 is executed at step 330.

The method 900 may be implemented as one or more software code modules of the software application program 133 resident in the storage module 109 and being controlled in its execution by the processor 105 of the camera 120A.

The method 900 sets the location and reference direction of each target frame patch and a pre-determined transform, but not the pixel projection. The method 900 first determines an active patch set at step 905. The active patch set is identified by comparing the discriminator values of the two portions of the oriented patch data region 1500. The portion of the oriented patch data region 1500 with the higher discriminator value may be selected. Then, the method 900 uses a loop structure beginning at selecting step 910 to process each reference alignment data oriented patch from the active patch set in turn.

Then at generating step 920, target frame oriented patch data is generated based on a predictive model of the selected oriented patch over time. The oriented patches may be updated by offsetting the location according to a previous target frame shift estimate at the patch location determined at step 340. An offset may be determined according to a distortion model generated for a previous target frame at step 350 (e.g., the most recent frame). Alternative models may use multiple previous distortion models to determine an offset. If no previous target frame information is available then the oriented patch data may be set to the reference alignment data patch location and direction, for example, in the case of the first target frame. The pre-determined transform is defined to be equivalent to an offset to shift a pixel location to a reference frame with origin at the target patch location followed by a rotation according to the reference direction of the target oriented patch data.

In some arrangements, additional data may be supplied with the target frame such as motion data from a gyroscope, accelerometer, or other motion sensing device, which may be used directly to determine an updated patch location. In an arrangement where such additional data is supplied, the motion data will need to be correctly normalised and transformed to pixel coordinates according to intrinsic parameters of the camera 120A. In another arrangement, motion data from recent distortion models or shift estimates may be combined to produce updated target patch location and reference direction data, and then the camera distortion model may be used. In general, however, the selected tracking method will not use any pixel analysis, but rather will use previously determined parameters and motion data.

Once step 920 is complete, if there are more selected oriented patches to analyse at step 930, then the method 900 returns to step 910. Otherwise, the method 900 concludes.

The method 1000 of determining patch shift estimates, as executed at step 340, will be described in further detail below with respect to FIG. 10. The method 1000 generates pixel projection data for the target frame oriented patches and uses the target frame oriented patches to determine shift estimates relative to the reference frame at each oriented patch. Pixel processing of the target frame used for the detection of calibration parameter changes occurs in the method 1000.

The method 1000 is divided into two processing sets of operations. The left side 1080 of the flow chart consists of pixel processing steps (which form the target oriented patch pixel projection data), while the right side 1090 consists of oriented patch processing (which determines the shift estimates). In the arrangement of the method 1000 shown in FIG. 10, the pixel processing steps receive the pixels of the target frame in raster order directly from a sensor of the camera 120A without caching or storing to memory 170. The receipt of the pixels in raster order is indicated by the loop structure starting at step 1010 and ending at step 1045.

At selecting step 1010, a pixel in the target frame is selected under execution of the co-processor 390 and stored in the RAM 170. As each pixel is considered in turn, the method 1000 stores and updates a set of pixel projection array structures corresponding to the set of target frame oriented patches that intersect the scan line (y-coordinate) of the pixel. The set of pixel projection array structures is updated by first allocating each pixel to a target frame oriented patch at allocating step 1020 if the pixel fits within the bounding box of a rotated patch of width and height given by the patch size defined in step 510 described above. Each pixel should be contained in a single target frame oriented patch bounding box assuming minimum spacing of patches at step 410 is more than the square root of two (2) multiplied by the patch size. As described previously, the pixel data may be stored in a number of different formats. The stored pixel, however, may be of the same format and colour channel as the pixel data used to generate reference patches at step 510 (e.g. a single luminance value).

If the pixel is found to be in the bounding box of an target frame oriented patch at step 1020, then at mapping step 1030, the pixel location is mapped to a position in a rotated patch at the patch location and reference direction using a pre-determined transformation from step 920. Next, if the pixel was in a bounding box at step 1020 and coordinates of the pixel in the rotated patch is less than half of the patch size along both axes, then the pixel projection is updated at updating step 1035 according to the position of the pixel along the axis parallel to the oriented patch and the interpolation method selected as was discussed previously with respect to step 820 of method 800.

After pixel projection at step 1035, if the current pixel is the last pixel in the bounding box of an oriented patch and the pixel projection for that oriented patch is complete, processing proceeds to step 1050. In the arrangement of FIG. 10, a message or control signal is sent to the patch analysis processing 1090 to process that oriented patch data according to steps 1050 to 1070 on the right side of FIG. 10.

Figure 10:
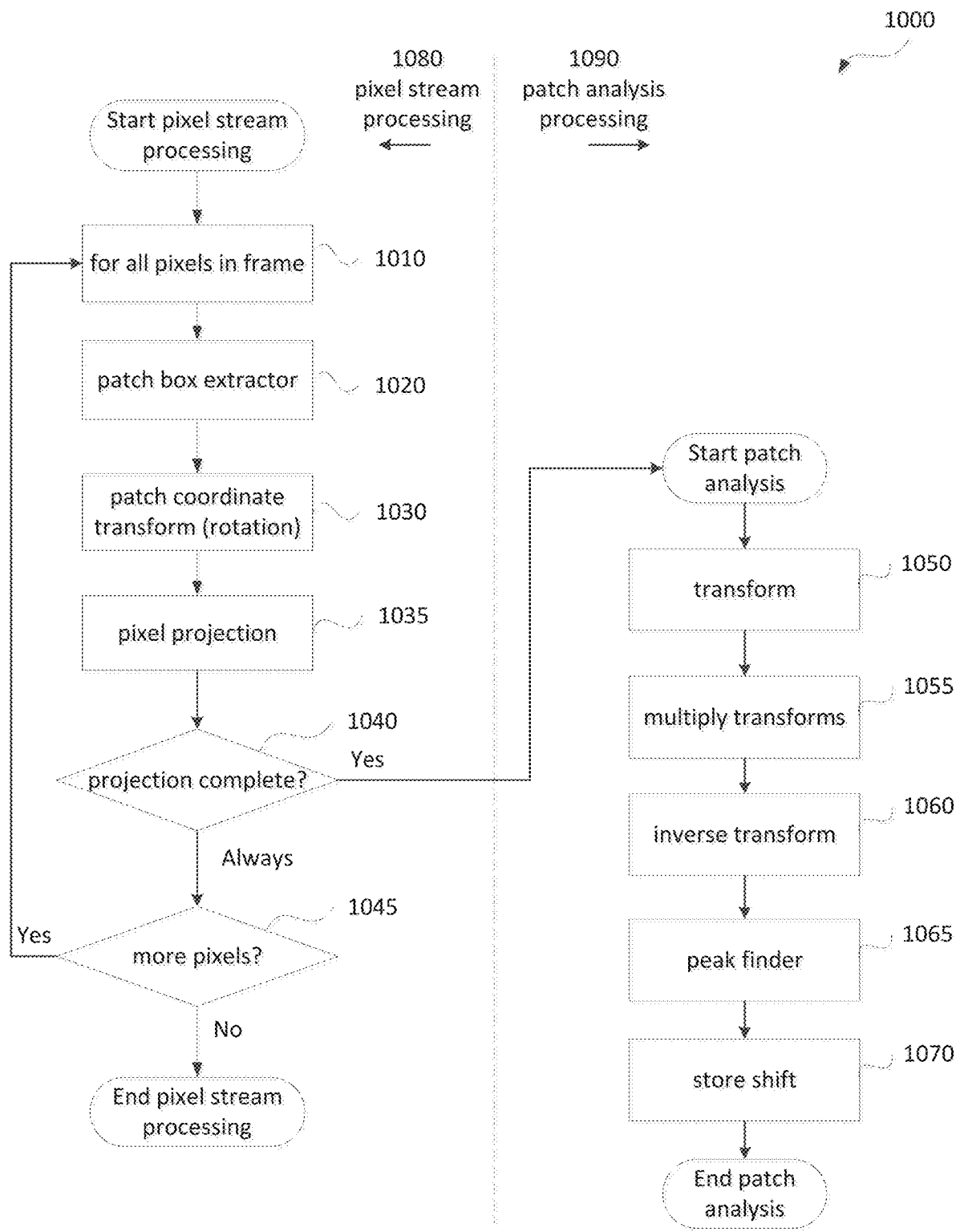
FIG. 10 is a schematic flow diagram of a method of determining patch shifts from image data.

In the arrangement of FIG. 10, the pixel stream processing is performed in a separate hardware or software block such that pixel stream processing (1090) continues independently of patch analysis processing. Within FIG. 10, the independent pixel processing is represented by continuation from step 1040 to step 1045 regardless of whether a projection is complete and patch analysis begins for the corresponding oriented patch from step 1050. If there are more pixels to process, then the pixel processing stream returns to step 1010. Otherwise, the pixel stream processing 1080 ends.

Independently of the pixel processing stream, the patch analysis processing 1090 is performed for all oriented patches when the projection data of the oriented patches is confirmed as complete by step 1040. A FIFO queue may be used to communicate results of the process 1080 to process 1090. The maximum size of a queue may be chosen to correspond to the maximum number of patch projections ending on the same scanline. A queue of sixteen (16) patch projections is utilised in one arrangement.

At transforming step 1050, the projection array is transformed, under execution of the co-processor 390. The array may optionally have the mean value of the array subtracted and be multiplied by a suitable 1D hedging function as discussed previously with reference to step 520. A Fourier transform is performed to prepare the projection data for shift estimation by a correlation based method.

Next, at multiplying step 1055, the transformed profile for the oriented patch in the target frame is multiplied with the corresponding transformed function generated at step 830 of method 800. Following step 1055, the product of the transformed reference and target frame patch profiles is transformed back to real space using an inverse Fourier transform. Next, at analysing step 1065, the real space profile generated at step 1060 is analysed by a peak finder, under execution of the co-processor 390. The peak finder should have a sub-pixel accuracy which may be achieved for example by fitting the largest peak in the data to a parabola. The position of the peak defines the shift estimate for the oriented patch in the target frame relative to the reference frame and is stored at storing step 1070. The height of the peak is referred to as the correlation peak ratio. The correlation peak ratio may be used to define a rejection criterion for patch shift estimates in the form of a correlation peak ratio threshold. A suitable correlation peak ratio threshold is the lower of a fixed parameter (1.5) and the 50th percentile of the distribution of peak ratios over the set of shifts for the frame. The set of patches with correlation peak ratio above the correlation peak ratio threshold may be referred to as valid patches while other may be rejected and not used in later processing.

At step 1070, the RAM memory 170 used by the pixel projection is cleared so that the RAM 170 may be used for a different oriented patch. The patch analysis for the oriented patch ends following step 1070.

Alternative shift estimation methods are known for 1D signals based on alternative transforms or comparison directly in real space. Steps 1050 to 1070 of method 1000 may be replaced by any other suitable method. The transform patch step 830 applied to oriented patches may need to be modified or skipped according to which alternative shift estimation method is used.

In addition to the methods described above being implemented as software executed by the general purpose processor 105 of camera 120A and the co-processor 390, the described methods may also be implemented in the form of a logic processor. Such logic processors may take the form of an application specific integrated circuit (ASIC) where the program is fixed at the time of manufacture.

Another form of logic processor is the field programmable gate array (FPGA), which is a reconfigurable logic processor. The advantage of an FPGA is that the FPGA may be reconfigured in the field after manufacture. An FPGA is a collection of general purpose logic blocks, which may include look-up tables, registers and memory regions, and programmable interconnections including FIFO, multiplexor and switching elements. The hardware components are typically configured using a bitstream, which is a sequence of binary values that specify the look up table logic values, FIFO and multiplexor connections and other properties of the reconfigurable hardware. The bitstream is typically loaded from a memory device such as a non-volatile read only memory (ROM) or volatile memory such as EEPROM or flash.

The advantage of implementing the described methods in a logic processor is that the stages of processing may be implemented in a pipeline fashion. In a pipeline, multiple steps in an algorithm can operate concurrently, passing data from one step to the next. A more detailed description of pipelining, and how pipelining operates will be provided with respect to the described methods below.

In an FPGA implementation of the described methods, it is beneficial to structure the implementation in a pipelined fashion. The following describes a pipelined implementation suitable for use in an FPGA of the shift estimation method 1000. One element of a pipelined implementation is an inter-stage FIFO, which is a FIFO that connects multiple pipeline stages together. An inter-stage FIFO may be implemented using a collection of volatile data storage components such as flip-flops or static RAM combined with control logic. However, other volatile data storage components may be used, depending on the reconfigurable logic processor. The inter-stage FIFO acts like a pipe with elements written to input end by a first pipeline stage appearing at the output end for reading by a second pipeline stage. The elements are stored in the FIFOs volatile data storage after writing until the elements are read by the second pipeline stage. The number of elements that can be stored in the FIFO is configured based on the requirements of the pipeline. The FIFO allows the first and second pipeline stages to work in an asynchronous fashion, as the FIFO can store the results of the first pipeline stage until the second pipeline stage is ready to consume the results of the first pipeline stage.

Figure 11:
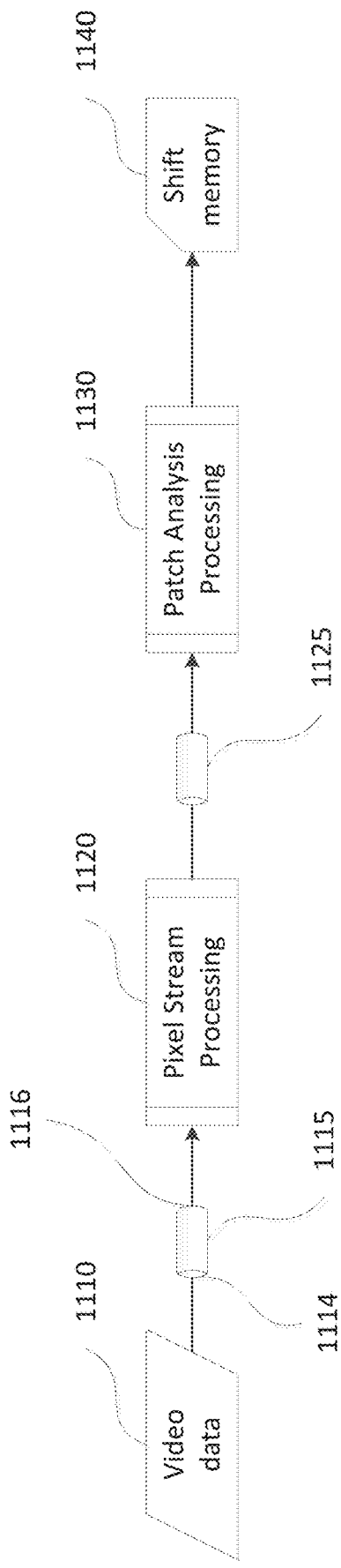
FIG. 11 is an illustration of a pipelined arrangement of a method of estimating patch shifts from image data.

An alternative arrangement of the method 1000 will now be described with reference to FIG. 11, where shifts for the target frame are determined. Video data 1110 captured by image sensing device 110 is streamed through an inter-stage FIFO 1115 to a pixel stream processing module 1120. The inter-stage FIFO has an input end 1114 connected to the video data 1110 and an output end 1116 connected to the pixel stream processing module 1120. Data is written to the input end 1114 and is made available at the output end 1116 for reading by the pixel stream processing module 1120.

The pixel stream processing module 1120 implements the pixel stream processing 1080 of the method 1000, and the patch analysis processing module 1130 implements the patch analysis processing 1090 of the method 1000. The pixel stream processing module 1120 and the patch analysis processing module 1130 will be described in further detail with reference to FIG. 12. The inter-stage FIFO 1125 operates in the same fashion as the inter-stage FIFO 1115. However, inter-stage FIFO 1125 may make available a different number of queue entries. When the patch analysis module 1130 has determined the shift value for each patch, the patch analysis module 1130 writes the shift value for each patch to attached shift memory 1140 which may be configured within RAM 170. The shift memory 1140 stores the results of measuring the shifts at each patch location. The results stored in the shift memory 1140 are then passed by a means that is appropriate to the implementation of step 350 which determines the target frame distortion parameters.

Figure 12B:
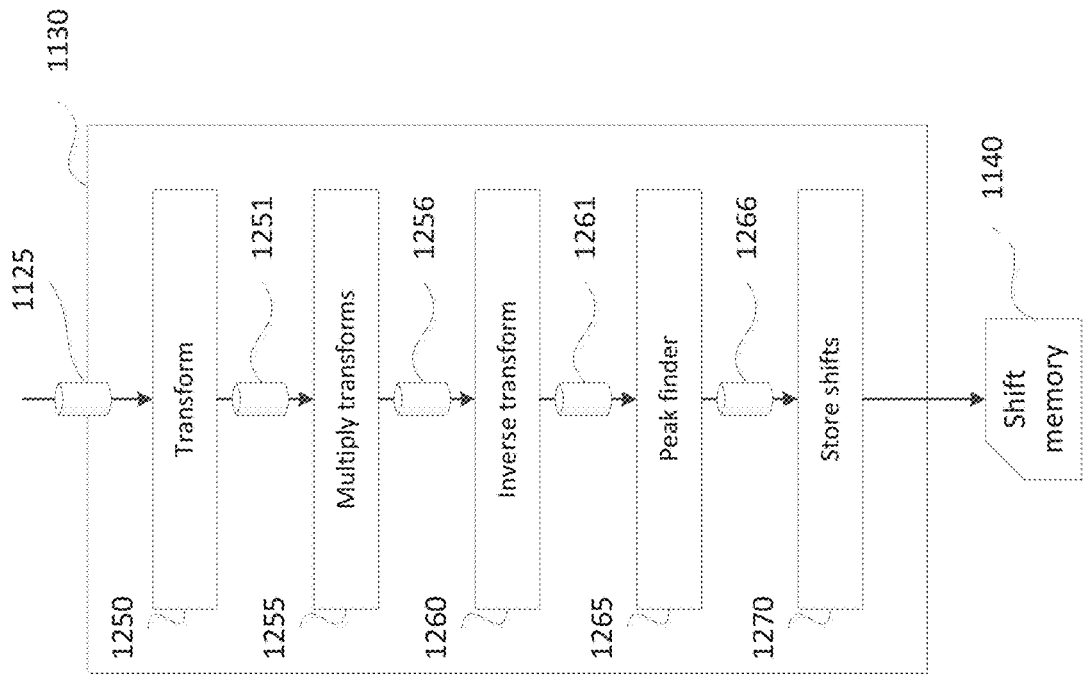
FIG. 12B shows a programmable logic implementation of a patch analysis processing module.
Figure 12A:
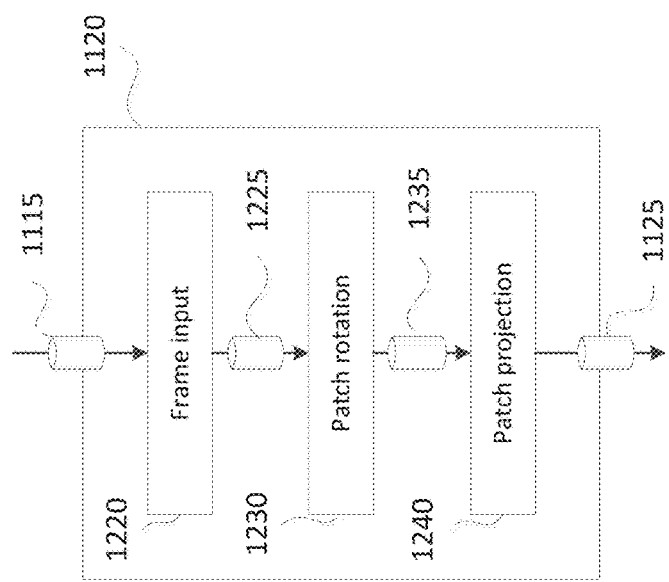
FIG. 12A shows a programmable logic implementation of a pixel stream processing module.

FIG. 12A shows a programmable logic implementation of the pixel stream processing module 1120, which implements the pixel stream processing 1080. There are three stages of the programmable logic implementation including frame input 1220, patch rotation 1230 and patch projection 1240. The stages are connected using the inter-stage FIFOs 1225 and 1235. The input to the frame input stage 1220 comes from the inter-stage FIFO 1115. The frame input stage 1220 implements the patch box extractor step 1020, and the output of the frame input stage 1220 is passed via the inter-stage FIFO 1225 to the input of the patch rotation stage 1230. The patch rotation stage implements the patch coordinate transform (rotation) step 1030 and passes an output of step 1030 via the inter-stage FIFO 1235 to the patch projection stage 1240. The patch projection stage implements the pixel projection process of 1035, accumulating the pixel data that will make the projected patch, and the projection complete decision 1040. When the projection complete status is yes, the patch projection stage 1240 passes the accumulated projected patch data as its output via the inter-stage FIFO 1125. FIG. 12B shows a programmable logic implementation of the patch analysis processing module 1130. Projected patch data is read from the inter-stage FIFO 1125 by the Transform module 1250, which performs a 1D Fourier transform of the projected patch data according to step 1050, producing a transformed patch. The transformed patch is passed to the multiply transforms stage 1255 by writing the transformed patch data to the inter-stage FIFO 1251. The multiply transforms stage takes the transformed patch from the transform stage 1250 and multiplies it by the pre-processed transformed reference patch according to step 1055. The multiplication is performed on a Fourier transform coefficient basis. The multiplied transform is passed via the inter-stage FIFO 1256 to the inverse transform stage 1260. The inverse transform stage 1260 performs an inverse Fourier transform to produce a correlation according to step 1060. The correlation produced by stage 1260 is passed to the peak finder stage 1265 by the FIFO 1261. The peak finder stage determines the peak in the correlation corresponding to the shift between the target and reference patch using step 1065. The position and strength of the peak are passed via inter-stage FIFO 1266 to the store shifts stage 1270 which stores the shift data to the shift memory 1140.

FIGS. 13A, 13B, 13C and 13D show an example of the pipelining process, in particular, with regard to how several patches from a video frame can be processed in parallel. FIG. 13A shows an example video frame defined by a video frame bounding box 1301, representing the area covered by the video frame. Within the video frame bounding box 1301 are four patch bounding boxes, labelled 1311, 1312, 1313 and 1314.

The size of the patch bounding boxes 1311 through 1314 relative to the video frame bounding box 1301 is for illustrative purposes only. Similarly, the small number of patches is for illustrative purposes. In one implementation, there may be tens (10s) or hundreds (100s) of patches in an HD (1920×1080 pixels), 4K (3840×2160 pixels) or 8K (7680×4320 pixels) frames. The patch sizes may typically be 32×32 for a HD frame, or larger such as 64×64 or 96×96 for 4K or 8K video frames.

FIG. 13B shows the patch analysis processing steps 1090 from FIG. 10. Each of the steps 1050, 1055, 1060, 1065 and 1070 is assigned to an equivalent pipeline stage 1250, 1255, 1260, 1065 and 1270 respectively. Joining the pipeline stages 1250 through 1270 are inter-stage FIFOs 1351, 1356, 1361 and 1366. The inter-stage FIFOs 1351, 1356, 1361 and 1366 communicate the results of each stage to the following stage. For example, inter-stage FIFO 1351 passes the Fourier transformed data and patch control data from the Fourier transform stage 1250 to the transform stage 1255. The inter-stage pipelines 1356, 1361 and 1366 perform similar operations for their connected stages.

FIG. 13C shows status of the pipeline stages while processing the target input frame in a raster order defined by point 1320 in FIG. 13A. At the point 1320, patches 1311 and 1312 have been processed by the pixel stream processing 1080 and have been passed to the patch analysis processing 1090. In the example of FIG. 13C, the processing of the patch 1311 by the transform stage 1250 has completed and patch 1311 has been passed through the inter-stage FIFO 1251 to the multiply transforms stage 1255. The patch 1312 is being processed by the Fourier transform stage 1250. The inverse transform 1260, peak finder stage 1265 and store shift stage 1270 are idle waiting for input from the inter-stage FIFOs 1356, 1361, and 1366 respectively.

FIG. 13D shows the status of the pipeline stages while processing the input frame in a raster order as at point 1321 in FIG. 13A. At the point 1321, patches 1311 and 1312 have progressed in processing to the store shift 1270 and peak finder 1265 stages respectively. Patch 1313 is being processed by the inverse transform stage 1260 and patch 1314 is being processed by the transform stage 1250.

As seen in FIG. 13D, the multiply transforms stage 1255 is idle. It can be seen from FIG. 13A that the patches 1311, 1312 and 1313 are clustered towards the top left while patch 1314 is near the bottom right. The pixel processing occurs in a raster scan fashion from the top left to the bottom right, and there is sufficient duration between the completion of scanning patches 1313 and 1314 to produce a "bubble" in the pipeline processing. A bubble is an idle processing stage that progresses along the pipeline stages along with patches being processed.

Figure 14:
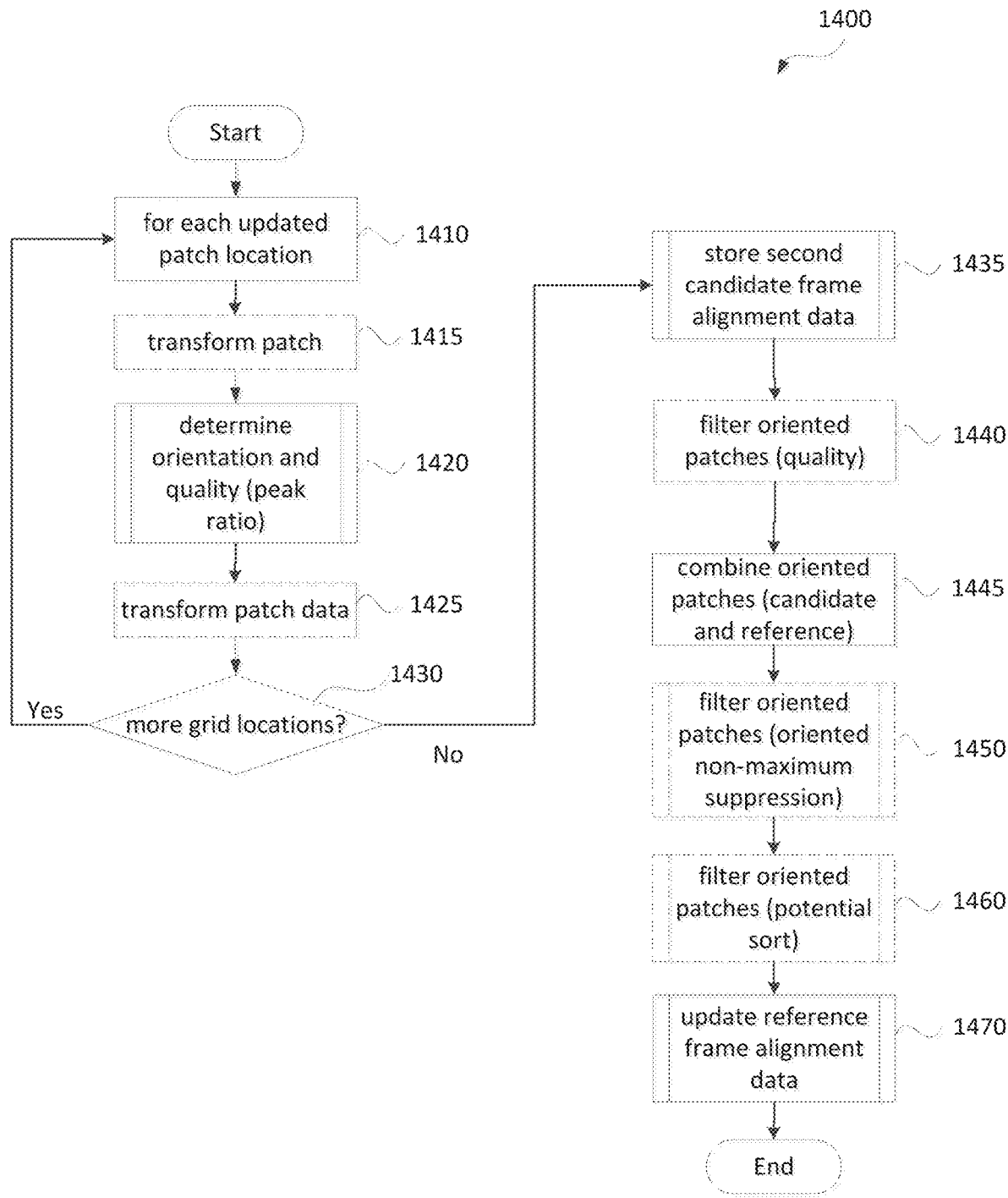
FIG. 14 is a schematic flow diagram showing a method of generating updated patch data for a candidate frame.

The method 1400 of generating updated oriented patch data, as executed at step 394, will be described in further detail below with respect to FIG. 14. The oriented patch data generated in accordance with the method 1400 may be in the same form of a set of oriented patch data as described in method 400 above. The method 1400 takes as input an image frame, referred to as the second candidate frame, the current set of reference alignment data including oriented patch data and patch confidence and quality metrics, and a set of updated patch locations generated at step 392 from a first candidate frame.

The method 1400 first uses a loop structure starting at selecting step 1410 to determine reference direction and quality information for patches at updated patch locations from the second candidate frame. The processing of patch update locations in the loop structure starting at step 1410 may be suitable for acceleration by parallel processing.

At selecting step 1410, a patch from the second candidate frame at the next patch location selected from the set of updated patch locations is created, under execution of the co-processor 390 and may be stored in the RAM 170. As described above, the updated patch locations and the second candidate image frame from which they were generated may or may not have been aligned with the original reference frame. If they have not been aligned, then the patch and the current patch location may be transformed to compensate for the known transform between the current frame being analysed and the reference frame if the frame pixels at step 1415.

The method 1400 continues at determining step 1420, where reference direction and quality information is determined for the patch at the updated patch location selected at step 1410. A method 500 of determining patch reference direction and quality information, as executed at step 1480, has been described above with reference to FIG. 5. Next, optional step 1425 may align the orientation and position of the oriented patch data according to the known transform between the candidate frame and the reference frame if the second candidate frame and updated patch location were not aligned to the reference frame originally and also were not corrected at step 1415.

Next, at determining step 1430, if there are more updated patch locations to analyse, then the method 1400 returns to step 1410. Otherwise, all updated patch locations from the second candidate frame have been analysed and processing continues to step 1435 where the oriented patch data for the second candidate frame is extracted and stored in RAM 170, for example. The oriented patch data is extracted in accordance with the method 800 which was described in detail above with reference to FIG. 8. The method 800 is executed at both step 490 and step 1435.

At step 1440, the set of oriented patches may be optionally filtered from the second candidate frame generated at step 1435 according to quality. A suitable method for filtering the set of oriented patches according to edge strength is to select a threshold for the edge strength parameter of each patch and to reject any patches with a lower quality than the threshold. In one embodiment, the value of the threshold depends on the expected performance of the camera 120A, and the environment. A suitable value may be 1.5. In another embodiment it may be set according to the distribution of edge strength over the image, for example it may be set to the 20% percentile of the distribution in order to filter out 20% of the patches.

At this stage, there are two sets of oriented patches being stored by the system. First, there is a set of oriented patches generated from the second candidate frame. Second, there are the oriented patches from the reference alignment data. The high confidence oriented patches from the reference alignment data are combined with the updated oriented patches at step 1445 to create a combined set of oriented patches. At this stage, the quality metric of the high confidence patches from the reference alignment data may be modified to be higher quality than any of the updated oriented patches from the second candidate frame. This ensures that all high confidence patches will be preserved in later filtering steps.

The combined set of oriented patches may then be filtered according to a series of optional processing steps 1450 to 1460 configured to select a set of patches that includes all of the high confidence oriented patches of the reference alignment data but to replace those with low confidence using new patches from the second candidate frame. At optional filtering step 1450, the set of oriented patches may be optionally filtered using an oriented non-maximum suppression process. A method 600 of selecting a suitable subset of oriented patches using non-maximal suppression, as executed at step 1460, was described above with reference to FIG. 6. Next, at optional filtering step 1460, the combined set of oriented patches may be further filtered using a potential sort process. A method 700 of filtering candidate patches using potential sort, was described above with reference to FIG. 7.

After filtering the combined set of oriented patches are suitable for use in frame alignment and may be advantageously used to update the current set of reference frame alignment data being used by the pixel real time processor 105.

Figure 15:
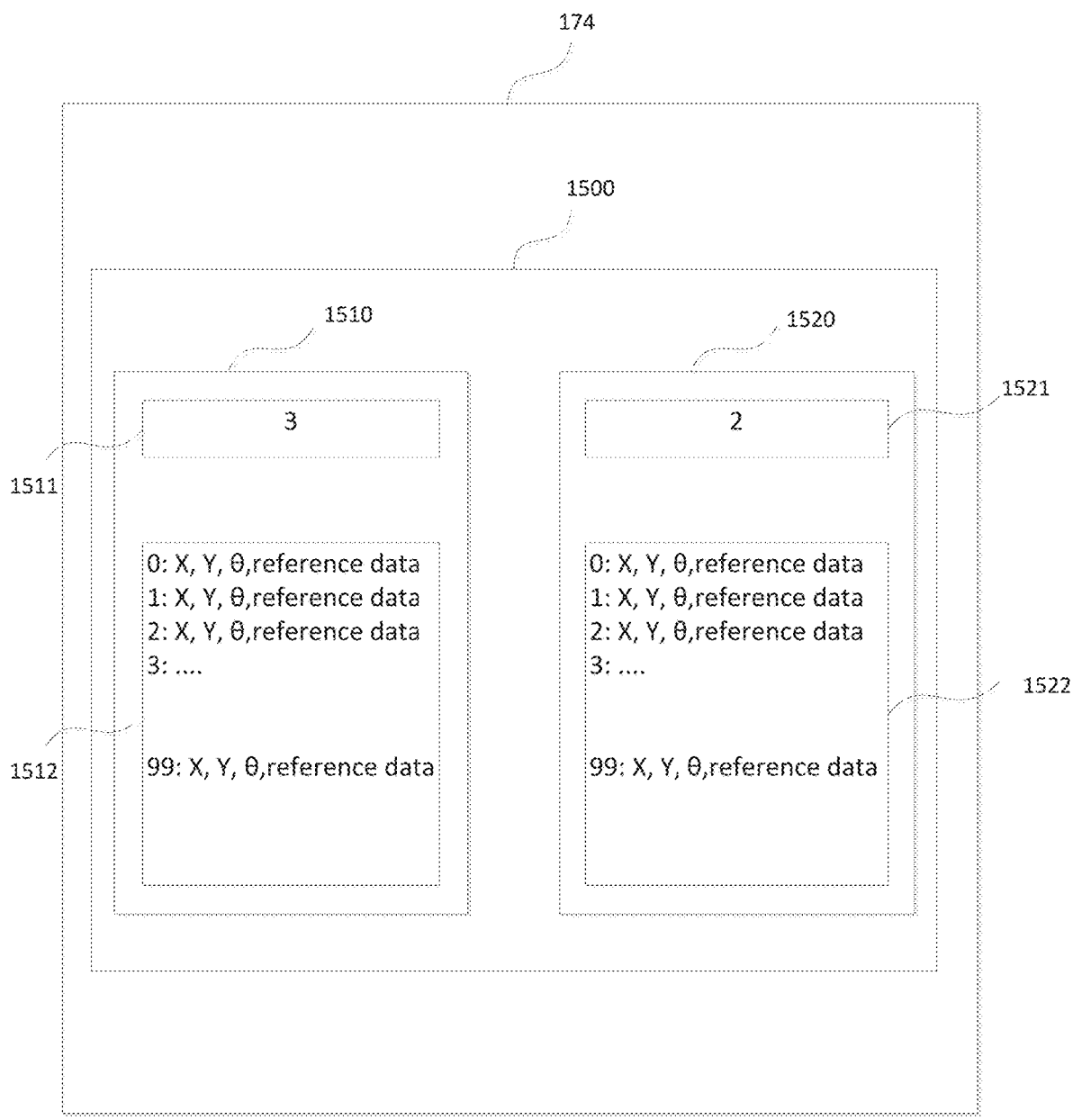
FIG. 15 shows a structure for the storage of oriented patch data.

Step 1470 performs this update step by filling in the inactive patch information table with the new oriented patch location and data. With respect to the patch information table structure 1500, portion 1510 is active while portion 1520 is inactive. The step 1470 will update the patch data table 1522 with the updated oriented patch data. When the data table update is complete step 1470 will update the discriminator value 1521. In the example of FIG. 15 the new value for discriminator 1521 will be 4. Note that there may be other means for indicating that there is new oriented patch data available for use in determining updated calibration parameters, and an embodiment need not be limited to the method described herein.

A suitable structure for the storage of the oriented patch data for the reference data will be described with respect to FIG. 15. The oriented patch data storage 1500 is stored within the intermediate memory 174. The storage 1500 is divided into two equal portions 1510 and 1520. Within portion 1510 there is a discriminator value 1511 and an oriented patch data information table 1512. The oriented patch data information table 1512 will store the oriented patch position as X and Y coordinates within the reference frame, as well as the patch orientation θ (theta) and the reference data. There will be entries for a pre-determined number of oriented patches. In one embodiment the number of patches may be 100. The is a second portion 1520 of the oriented patch storage 1500 will be structured in the same manner as 1510 with a discriminator value 1521 and patch data information table 1522.

INDUSTRIAL APPLICABILITY

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

The invention claimed is:

1. An image processing apparatus comprising:
one or more memories storing instructions; and
one or more processors executing the instructions to:
obtain a first plurality of reference patch locations in a reference image and first reference alignment data for each of the first plurality of reference patch locations;
correct, based on the first plurality of reference patch locations and the first reference alignment data, a first image and a second image which are different from the reference image;
determine, based on the first image and the second image, a second plurality of reference patch locations and second reference alignment data for each of the second plurality of reference patch locations;
correct, based on the second plurality of reference patch locations and the second reference alignment data, a third image different from the reference image, the first image and the corrected second image.

2. The image processing apparatus according to claim 1, wherein the second plurality of reference patch locations is determined based on the first image and the second reference alignment data is determined based on locations included in the second image and corresponding to the second plurality of reference patch locations.

3. The image processing apparatus according to claim 1, wherein the second plurality of reference patch locations is determined based on a predetermined schedule.

4. The image processing apparatus according to claim 1, wherein the second plurality of reference patch locations is determined based on an instruction from a user.

5. The image processing apparatus according to claim 1, wherein the second plurality of reference patch locations and the second reference alignment data are determined based on a degree of confidence of the first image and a degree of confidence of the second image.

6. The image processing apparatus according to claim 5, wherein, in a case where the degree of confidence of the first image is higher than a threshold, the second plurality of reference patch locations is determined.

7. The image processing apparatus according to claim 5, wherein, in a case where the degree of confidence of the second image is higher than a threshold, the second reference alignment data is determined.

8. The image processing apparatus according to claim 1, wherein the second plurality of reference patch locations is determined based on the first image prior to the correction or based on the first image after the correction.

9. The image processing apparatus according to claim 1, wherein the second reference alignment data is determined based on the second image prior to the correction or based on the second image after the correction.

10. The image processing apparatus according to claim 1, wherein the second plurality of reference patch locations and the second reference alignment data are determined based on a degree of confidence of the first reference alignment data and a degree of confidence of a candidate for a patch location in the first image.

11. The image processing apparatus according to claim 1, wherein the first reference alignment data includes data based on an image feature.

12. The image processing apparatus according to claim 11, wherein the first reference alignment data further includes data based indicating a degree of confidence.

13. An image processing method comprising:
obtaining a first plurality of reference patch locations in a reference image and first reference alignment data for each of the first plurality of reference patch locations;
correcting, based on the first plurality of reference patch locations and the first reference alignment data, a first image and a second image which are different from the reference image;
determining, based on the first image and the second image, a second plurality of reference patch locations and second reference alignment data for each of the second plurality of reference patch locations;
correcting, based on the second plurality of reference patch locations and the second reference alignment data, a third image different from the reference image, the first image and the corrected second image.

14. A non-transitory computer-readable recording medium storing a program that causes a computer to execute an image processing method comprising:
obtaining a first plurality of reference patch locations in a reference image and first reference alignment data for each of the first plurality of reference patch locations;
correcting, based on the first plurality of reference patch locations and the first reference alignment data, a first image and a second image which are different from the reference image;
determining, based on the first image and the second image, a second plurality of reference patch locations and second reference alignment data for each of the second plurality of reference patch locations;
correcting, based on the second plurality of reference patch locations and the second reference alignment data, a third image different from the reference image, the first image and the corrected second image.

* * * * *